United States Patent
Zhong et al.

(10) Patent No.: US 11,140,079 B2
(45) Date of Patent: Oct. 5, 2021

(54) SERVICE SENDING METHOD AND APPARATUS, SERVICE RECEIVING METHOD AND APPARATUS, AND NETWORK SYSTEM

(71) Applicant: HUAWEI TECHNOLOGIES CO., LTD., Guangdong (CN)

(72) Inventors: Qiwen Zhong, Shenzhen (CN); Min Zha, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 16/282,832

(22) Filed: Feb. 22, 2019

(65) Prior Publication Data

US 2019/0190829 A1    Jun. 20, 2019

Related U.S. Application Data

(63) Continuation of application No. PCT/CN2017/098484, filed on Aug. 22, 2017.

(30) Foreign Application Priority Data

Aug. 25, 2016  (CN) .......................... 201610724178.X

(51) Int. Cl.
*H04L 12/801*    (2013.01)
*H04L 1/00*    (2006.01)
(Continued)

(52) U.S. Cl.
CPC ............... *H04L 47/10* (2013.01); *H04J 3/07* (2013.01); *H04J 3/1658* (2013.01); *H04L 1/00* (2013.01)

(58) Field of Classification Search
None
See application file for complete search history.

(56) References Cited

U.S. PATENT DOCUMENTS

| | | | |
|---|---|---|---|
| 2004/0202198 | A1 | 10/2004 | Walker et al. |
| 2008/0075113 | A1* | 3/2008 | Harley .................. H04J 3/1652 370/466 |

(Continued)

FOREIGN PATENT DOCUMENTS

| | | |
|---|---|---|
| CN | 1173772 A | 2/1998 |
| CN | 1499776 A | 5/2004 |

(Continued)

OTHER PUBLICATIONS

Office Action issued in Japanese Application No. 2019/510,840 dated Mar. 26, 2020, 8 pages (With English Translation).

(Continued)

*Primary Examiner* — Jamaal Henson
(74) *Attorney, Agent, or Firm* — Fish & Richardson P.C.

(57) ABSTRACT

Embodiments of the present disclosure disclose a service sending method and apparatus, a service receiving method and apparatus, and a network system. The service sending method includes: obtaining, by a transmit-end device, an original data flow; inserting an increment tag p in the original data flow, to generate a first data flow, where the increment tag p is used to identify a quantity of changed idle units of the first data flow relative to the original data flow; and sending the first data flow. In the embodiments of the present disclosure, transparent transport of clock frequency and time phase information of a service is implemented.

12 Claims, 27 Drawing Sheets

(51) Int. Cl.
*H04J 3/16* (2006.01)
*H04J 3/07* (2006.01)

(56) References Cited

U.S. PATENT DOCUMENTS

| | | | |
|---|---|---|---|
| 2009/0154475 A1* | 6/2009 | Lautenschlaeger | H04L 47/28 370/400 |
| 2010/0086300 A1* | 4/2010 | Jiang | H04J 3/1658 398/46 |
| 2013/0004168 A1 | 1/2013 | Ohara et al. | |
| 2013/0166828 A1 | 6/2013 | Chun | |
| 2017/0006360 A1* | 1/2017 | Gareau | G06F 13/40 |

FOREIGN PATENT DOCUMENTS

| | | |
|---|---|---|
| CN | 101087245 A | 12/2007 |
| CN | 101425944 A | 5/2009 |
| CN | 101631064 A | 1/2010 |
| CN | 101692632 A | 4/2010 |
| CN | 102594658 A | 7/2012 |
| CN | 105323053 A | 2/2016 |
| CN | 104471888 B | 9/2017 |
| EP | 0818941 A2 | 1/1998 |
| JP | H09247156 A | 9/1997 |
| JP | 2003508957 A | 3/2003 |
| JP | 2004180215 A | 6/2004 |
| JP | 4609406 B2 | 1/2011 |
| JP | 2011507430 A | 3/2011 |
| JP | 2011193126 A | 9/2011 |
| JP | 2013239940 A | 11/2013 |
| KR | 20020026265 A | 4/2002 |
| WO | 2009115481 A1 | 9/2009 |

OTHER PUBLICATIONS

AMCC, "Information Transparent Transport of 10 GbE LAN Signals over OTN," ITU COM 15-D 79-E,, Study Group 15—Delayed Contribution 78, XP017407196, Nov. 29-Dec. 3, 2004, 15 pages.
Extended European Search Report issued in European Application No. 17842904.9 dated Jul. 3, 2019, 10 pages.
Huawei Technologies Co., Ltd et al., "Considerations on the mapping of FlexE Client and Subrate signals into OTN," ITU COM 15-C 1195-E, Study Group 15—Contribution 1195, XP044136869, Jun. 2015, 13 pages.
Optical Internetworking Forum, "Flex Ethernet, Implementation Agreement," IA # OIF-FLEXE-01.0, XP055509044, Mar. 2016, 31 pages.
Office Action issued in Chinese Application No. 201610724178.X dated Mar. 3, 2020, 9 pages.
IEEE Std 1588™-2008, "IEEE Standard for a Precision Clock Synchronization Protocol for Networked Measurement and Control Systems," IEEE Instrumentation and Measurement Society, Jul. 24, 2008, 289 pages.
PCT International Search Report and Written Application issued in International Application No. PCT/CN2017/098484 dated Nov. 16, 2017, 15 pages (with English translation).
Office Action issued in Korean Application No. 2019-7007631 dated Oct. 26, 2020, 4 pages (with English translation).
Nokia, Alcatel-Lucent Shanghai Bell , "Radio resource management in NR," 3GPP TSG-RAN WG1#85, R1-165376, Nanjing, P. R. China, May 23-27, 2016, 4 pages.
Office Action issued in Chinese Application No. 201610724178.X dated Mar. 22, 2021, 7 pages (with English translation).

* cited by examiner

SERVICE SENDING METHOD AND APPARATUS, SERVICE RECEIVING METHOD AND APPARATUS, AND NETWORK SYSTEM

CROSS-REFERENCE TO RELATED APPLICATIONS

This application is a continuation of International Application No. PCT/CN2017/098484, filed on Aug. 22, 2017, which claims priority to Chinese Patent Application No. 201610724178.X, filed on Aug. 25, 2016, The disclosures of the aforementioned applications are hereby incorporated by reference in their entireties.

TECHNICAL FIELD

The present invention relates to the communications field, and in particular, to a service sending method and apparatus, a service receiving method and apparatus, and a network system.

BACKGROUND

Flexible Ethernet (FlexE) combines some technical characteristics of Ethernet and a transport network (such as an optical transport network (OTN) or a synchronous digital hierarchy (SDH) network), and is an important milestone of evolution of an Ethernet technology. As a flexible Ethernet technology emerges, an Ethernet physical interface presents a virtualization characteristic. A plurality of Ethernet physical interfaces are bonded together to support several virtual logical ports. For example, one 400 Gigabit (400 G) flexible Ethernet physical interface group obtained by bonding four 100 Gigabit Ethernet (100 GE) physical interfaces can support several logical ports.

An Ethernet physical interface is an asynchronous communications interface, and allows a clock frequency difference of ±100 ppm (one ten-thousandth). For example, in 10 GE, for two physical interfaces with a nominal bandwidth of 10 G, a bandwidth of one physical interface may be greater than the nominal value by one ten-thousandth, and a bandwidth of the other physical interface is less than the nominal value by one ten-thousandth, that is, the two bandwidths are 10 G×(1+0.0001) and 10 G×(1−0.0001) respectively. A clock frequency of a logical port inherits a clock frequency characteristic of a physical interface, and also has a deviation of 100 ppm. For example, for logical ports with a nominal bandwidth of 25 G that are on two different physical interfaces or in two different physical interface groups, excluding timeslot division and timeslot management overheads of the flexible Ethernet, actual bandwidths may be approximately 25 G×(20460/20461)×(1+0.0001) and 25 G×(20460/20461)×(1−0.0001) respectively. When the flexible Ethernet is used to carry a service, an idle block (Idle) needs to be inserted or deleted hop by hop, to make a service rate adapt to a bandwidth rate deviation between physical interfaces or logical ports. As shown in FIG. 1, when flexible Ethernet devices Pa, Pb, and Pc carry a service between customer devices Ca and Cb, an idle unit needs to be inserted or deleted on Pa, Pb, and Pc.

However, inserting or deleting an idle block causes a loss of clock frequency and time phase information of a service, that is, the clock frequency and time phase information of the service cannot be transported transparently. As a result, a clock frequency and a time phase of a source network device of the service cannot be kept synchronous with those of a sink network device of the service.

SUMMARY

In view of this, embodiments of the present invention provide a service sending method and apparatus, a service receiving method and apparatus, and a network system, to resolve a problem that a clock frequency and a time phase of a source network device of a service cannot be kept synchronous with those of a sink network device of the service because clock frequency and time phase information of the service cannot be transported transparently on flexible Ethernet.

According to a first aspect, an embodiment of the present invention provides a service sending method, including: obtaining, by a transmit-end device, an original data flow; inserting an increment tag p in the original data flow, to generate a first data flow, where the increment tag p is used to identify a quantity of changed idle units of the first data flow relative to the original data flow; and sending the first data flow.

The transmit-end device inserts the increment tag p in the original data flow, to identify the quantity of changed idle units of the first data flow relative to the original data flow. Therefore, a receive-end device can restore the original data flow according to the increment tag p, so as to obtain clock frequency and time phase information of the original data flow. This implements transparent transport of clock frequency and time phase information of a service.

In a possible implementation, the inserting an increment tag p in the original data flow includes: obtaining a first segment data flow from the original data flow, and determining a quantity of changed idle units of the first segment data flow relative to the original data flow; and inserting an increment tag p at a first location in the first segment data flow, where the first location is a location of a data unit that can be used to carry the increment tag p, and the increment tag p is used to identify the quantity of changed idle units of the first segment data flow relative to the original data flow.

The original data flow is segmented, so as to insert an increment tag p by segment. Before the quantity of changed idle units of the first segment data flow relative to the original data flow is determined, an idle unit may be inserted to or deleted from the first segment data flow.

In a possible implementation, the obtaining a first segment data flow from the original data flow includes: identifying a start unit of the original data flow, and determining a location of the start unit as the first location.

The start unit may be a block unit having a fixed pattern, that is, having redundant information. Therefore, the start unit may be used to carry the increment tag p. Optionally, a boundary of the first segment data flow may be further determined according to the location of the start unit. That is, the start unit may be used to carry the increment tag p, or may be used to determine a boundary between two adjacent segment data flows.

In a possible implementation, the obtaining a first segment data flow from the original data flow includes: setting a threshold of the increment tag p; identifying a first idle unit of the original data flow when the quantity of changed idle units of the first segment data flow relative to the original data flow is greater than or equal to the threshold; and determining a location of the first idle unit as the first location, and determining a boundary of the first segment data flow according to the first location.

To ensure that sufficient data units in the original data flow can carry an increment tag p, optionally, another redundant unit other than an idle unit may be used to carry an increment tag p. By setting the threshold, a specific quantity of idle units may be properly used to carry an increment tag p, to avoid overusing idle units.

In a possible implementation, before the inserting an increment tag p in the original data flow, the method further includes: inserting and/or deleting n idle units in the original data flow, and determining the increment tag p according to the n idle units, where p is equal to n when the n idle units are inserted; or p is equal to −n when the n idle units are deleted.

After an idle unit is inserted in or deleted from the original data flow, a quantity of inserted or deleted idle units may be identified in real time by using an increment tag p.

According to a second aspect, an embodiment of the present invention provides a service receiving method, including: receiving, by a receive-end device, a first data flow; extracting an increment tag p from the first data flow, where the increment tag p is used to identify a quantity of changed idle units of the first data flow relative to an original data flow; and restoring the first data flow to the original data flow according to the increment tag p.

The receive-end device extracts the increment tag p from the first data flow; determines, according to the increment tag p, the quantity of changed idle units of the first data flow relative to the original data flow; and restores the first data flow to the original data flow, so as to obtain clock frequency and time phase information of the original data flow. This implements transparent transport of clock frequency and time phase information of a service.

In a possible implementation, the extracting an increment tag p from the first data flow includes: obtaining a first segment data flow from the first data flow, and determining a first location in the first segment data flow; and extracting an increment tag p from the first location, where the first location is a location of a data unit that can be used to carry the increment tag p, and the increment tag p is used to identify a quantity of changed idle units of the first segment data flow relative to the original data flow.

The first data flow is segmented, so as to extract an increment tag p by segment.

In a possible implementation, the restoring the first data flow to the original data flow includes: inserting p idle units in the first data flow when the increment tag p is greater than 0; or reducing idle units, whose quantity is an absolute value of p, from the first data flow when the increment tag p is less than 0.

The first data flow is restored to the original data flow through counter-insertion or counter-deletion of the idle units.

In a possible implementation, the first location is a location of a start unit or a location of a first idle unit.

A data unit (such as a start unit or an idle unit) having redundant information may be used to carry the increment tag p. In addition, a boundary of the first segment data flow may be further determined according to the first location.

In a possible implementation, the method further includes: obtaining a clock frequency of the original data flow.

After the first data flow is restored to the original data flow, the clock frequency of the original data flow may be obtained. This implements transparent transport of a clock frequency of a service.

According to a third aspect, an embodiment of the present invention provides a service sending apparatus, including: an obtaining module, configured to obtain an original data flow; a tag module, configured to insert an increment tag p in the original data flow, to generate a first data flow, where the increment tag p is used to identify a quantity of changed idle units of the first data flow relative to the original data flow; and a sending module, configured to send the first data flow.

The service sending apparatus inserts the increment tag p in the original data flow, to identify the quantity of changed idle units of the first data flow relative to the original data flow. Therefore, a service receiving apparatus can restore the original data flow according to the increment tag p, so as to obtain clock frequency and time phase information of the original data flow. This implements transparent transport of clock frequency and time phase information of a service.

In a possible implementation, the tag module is configured to: obtain a first segment data flow from the original data flow, and determine a quantity of changed idle units of the first segment data flow relative to the original data flow; and insert an increment tag p at a first location in the first segment data flow, where the first location is a location of a data unit that can be used to carry the increment tag p, and the increment tag p is used to identify the quantity of changed idle units of the first segment data flow relative to the original data flow.

Before the quantity of changed idle units of the first segment data flow relative to the original data flow is determined, an idle unit may be inserted in or deleted from the first segment data flow. The original data flow is segmented, so as to insert an increment tag p by segment.

In a possible implementation, the tag module is configured to: identify a start unit of the original data flow, and determine a location of the start unit as the first location.

The start unit may be a block unit having a fixed pattern, that is, having redundant information. Therefore, the start unit may be used to carry the increment tag p. Optionally, a boundary of the first segment data flow may be further determined according to the location of the start unit. That is, the start unit may be used to carry the increment tag p, or may be used to determine a boundary between two adjacent segment data flows.

In a possible implementation, the tag module is configured to: set a threshold of the increment tag p; identify a first idle unit of the original data flow when the quantity of changed idle units of the first segment data flow relative to the original data flow is greater than or equal to the threshold; and determine a location of the first idle unit as the first location.

To ensure that sufficient data units in the original data flow can carry an increment tag p, optionally, another redundant unit other than an idle unit may be used to carry an increment tag p. By setting the threshold, a specific quantity of idle units may be properly used to carry an increment tag p, to avoid overusing idle units.

In a possible implementation, the apparatus further includes an insertion/deletion module. The insertion/deletion module is configured to: insert and/or delete n idle units in the original data flow, and determine the increment tag p according to the n idle units, where p is equal to n when the n idle units are inserted; or p is equal to −n when the n idle units are deleted.

After an idle unit is inserted in or deleted from original data, a quantity of inserted or deleted idle units may be identified in real time by using an increment tag p.

According to a fourth aspect, an embodiment of the present invention provides a service receiving apparatus, including: a receiving module, configured to receive a first data flow; an extraction module, configured to extract an increment tag p from the first data flow, where the increment tag p is used to identify a quantity of changed idle units of the first data flow relative to an original data flow; and a restoration module, configured to restore the first data flow to the original data flow according to the increment tag p.

The service receiving apparatus extracts the increment tag p from the first data flow; determines, according to the increment tag p, the quantity of changed idle units of the first data flow relative to the original data flow; and restores the first data flow to the original data flow, so as to obtain clock frequency and time phase information of the original data flow. This implements transparent transport of clock frequency and time phase information of a service.

In a possible implementation, the extraction module is configured to: obtain a first segment data flow from the first data flow, and determine a first location in the first segment data flow; and extract an increment tag p from the first location, where the first location is a location of a data unit that can be used to carry the increment tag p, and the increment tag p is used to identify a quantity of changed idle units of the first segment data flow relative to the original data flow.

The first data flow is segmented, so as to extract an increment tag p by segment.

In a possible implementation, the restoration module is configured to: insert p idle units in the first data flow when the increment tag p is greater than 0; or delete idle units, whose quantity is an absolute value of p, from the first data flow when the increment tag p is less than 0.

The first data flow is restored to the original data flow through counter-insertion or counter-deletion of the idle units.

In a possible implementation, the first location is a location of a start unit or a location of a first idle unit.

A data unit (such as a start unit or an idle unit) having redundant information may be used to carry the increment tag p. In addition, a boundary of the first segment data flow may be further determined according to the first location.

In a possible implementation, the apparatus further includes a clock module, configured to obtain a clock frequency of the original data flow.

After the first data flow is restored to the original data flow, the clock frequency of the original data flow may be obtained. This implements transparent transport of a clock frequency of a service.

According to a fifth aspect, an embodiment of the present invention provides a network system, including the apparatus according to any one of the third aspect or the possible implementations of the third aspect, and the apparatus according to any one of the fourth aspect or the possible implementations of the fourth aspect.

According to a sixth aspect, an embodiment of the present invention provides a network device, including a processor, a memory, and at least one network interface. The memory is configured to store a computer-executable instruction. When the network device runs, the processor executes the computer-executable instruction stored in the memory, so that the network device executes the method according to any one of the first aspect or the possible implementations of the first aspect.

According to a seventh aspect, an embodiment of the present invention provides a network device, including a processor, a memory, and at least one network interface. The memory is configured to store a computer-executable instruction. When the network device runs, the processor executes the computer-executable instruction stored in the memory, so that the network device executes the method according to any one of the second aspect or the possible implementations of the second aspect.

BRIEF DESCRIPTION OF DRAWINGS

To describe the technical solutions in the embodiments of the present invention or in the prior art more clearly, the following briefly describes the accompanying drawings required for describing the background and the embodiments.

FIG. 4 is a schematic diagram of a format of a start block according to an embodiment of the present invention;

FIG. 5 is a schematic diagram of formats of six types of blocks according to an embodiment of the present invention;

FIG. 6 is a schematic diagram of formats of three types of blocks according to an embodiment of the present invention;

FIG. 8 is a schematic diagram of a format of a block according to an embodiment of the present invention;

FIG. 11 is a schematic diagram of a format of a data flow according to an embodiment of the present invention;

FIG. 12 is a schematic diagram of formats of five types of blocks according to an embodiment of the present invention;

DESCRIPTION OF EMBODIMENTS

To make the objectives, technical solutions, and advantages of the present invention clearer and more comprehensible, the following further describes the present invention in detail with reference to the accompanying drawings and embodiments.

The technical solutions provided in the embodiments of the present invention may be applied to flexible Ethernet, and may be further applied to another type of network, such as Ethernet, an optical transport network (OTN), or a synchronous digital hierarchy (SDH) network. The embodiments of the present invention are mainly described by using the flexible Ethernet as an example.

Figure 1:
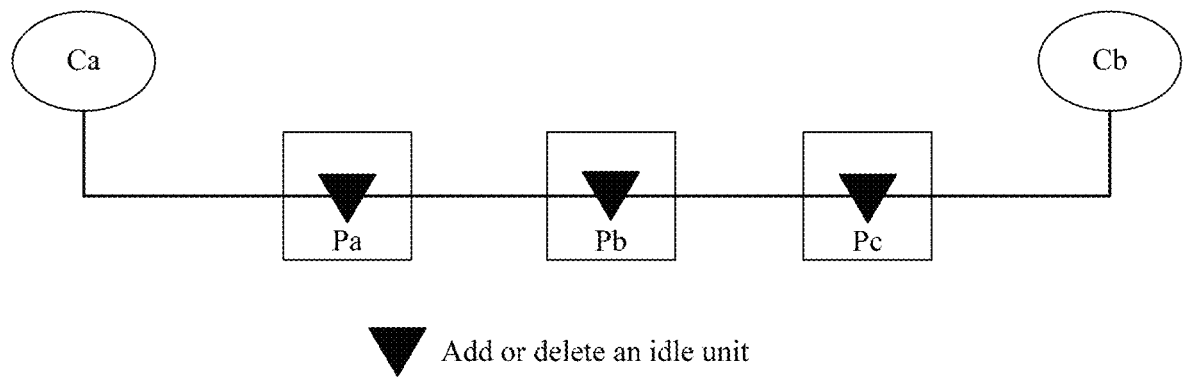
FIG. 1 is a schematic diagram of service transmission on flexible Ethernet in the prior art.
Figure 2A:
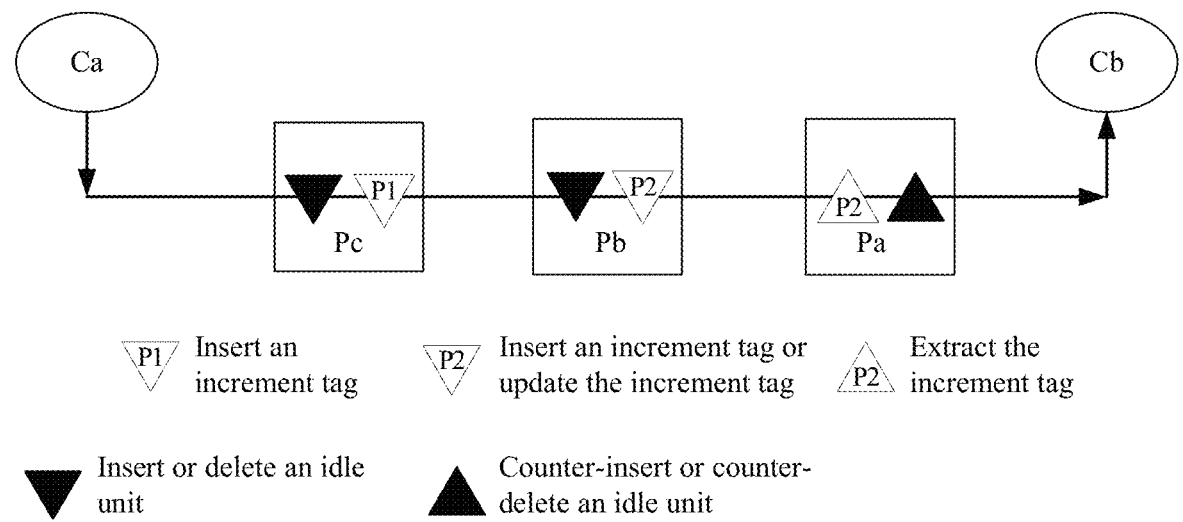
FIG. 2a is a schematic diagram of service transmission on flexible Ethernet according to an embodiment of the present invention.

FIG. 2a is a schematic diagram of service transmission on flexible Ethernet according to an embodiment of the present invention. As shown in FIG. 2a, a customer device Ca needs to send a service to a customer device Cb, and service transmission may be performed between Ca and Cb by using a bearer network. For example, flexible Ethernet including a plurality of flexible Ethernet devices (such as Pa, Pb, and Pc) is used as the bearer network. The customer device may be a device such as a router or a switch. A flexible Ethernet device may be an Ethernet device, an OTN device, an SDH device, or the like.

In the prior art, an idle unit needs to be inserted or deleted, to adapt to a rate difference between physical interfaces or logical ports of a flexible Ethernet device. This causes a loss of clock frequency and time phase information of a service. In the embodiments of the present invention, to transparently transport clock frequency and time phase information of a service, an increment tag p may be inserted after a transmit-end device on flexible Ethernet inserts or deletes an idle unit, to identify a quantity of inserted or deleted idle units of a data flow, obtained after the transmit-end device inserts or deletes the idle unit, relative to an original data flow. After inserting or deleting an idle unit, an intermediate device needs to update the increment tag p or insert a new increment tag p, to record a quantity of inserted or deleted idle units of a data flow, obtained after the present device inserts or deletes the idle unit, relative to the original data flow. After receiving a data flow from an adjacent upstream device, a receive-end device extracts an increment tag p that is on the flexible Ethernet and that is obtained after a last update, and restores the original data flow according to the increment tag p that is obtained after the last update. A value of p may be [ . . . , −3, −2, −1, 0, +1, +2, +3, . . . ]. 0 indicates that no idle unit is inserted or deleted, −1 indicates that one idle unit is deleted, −2 indicates that two idle units are deleted, +1 indicates that one idle unit is inserted, +2 indicates that two idle units are inserted, and so on. In the following, increment tags on different devices are represented by p1, p2, and the like.

For example, the transmit-end device Pa on the flexible Ethernet receives an original data flow of a service from the customer device Ca, and after inserting or deleting an idle unit in the original data flow, inserts an increment tag p1, to identify a quantity of inserted or deleted idle units of a data flow, obtained after Pa inserts or deletes the idle unit, relative to the original data flow. The intermediate device Pb inserts or deletes an idle unit in the received data flow, and inserts an updated increment tag p2, to identify a quantity of inserted or deleted idle units of a data flow, obtained after Pb inserts or deletes the idle unit, relative to the original data flow. For example, when p1 is −1, p2 is 0 if Pb inserts one idle unit, or P2 is −2 if Pb deletes one idle unit. The intermediate device may include a plurality of devices, and an execution method is similar. After receiving the data flow from the adjacent upstream device Pb, the receive-end device Pc extracts the increment tag p2 from the data flow, and counter-inserts or counter-deletes an idle unit according to the increment tag p2, that is, restores the original data flow of the service. The counter-inserting or counter-deleting an idle unit is: If p2 idle units are inserted in the original data flow, the receive-end device Pc deletes p2 idle units; or if p2 idle units are deleted from the original data flow, the receive-end device Pc inserts p2 idle units. A quantity of idle units in the restored original data flow is the same as that in the original data flow that is before Pa inserts or deletes the idle unit. Therefore, the receive-end device Pc may obtain clock frequency and time phase information of the original data flow according to the restored original data flow, implementing transparent transport of the clock frequency and time phase information of the service.

Figure 2B:
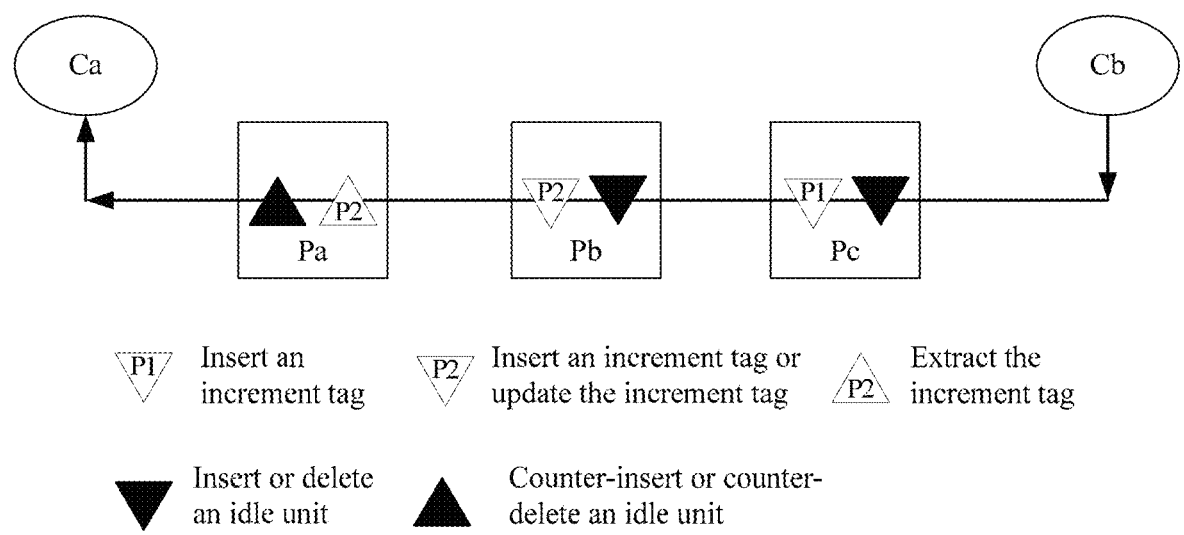
FIG. 2b is a schematic diagram of service transmission on flexible Ethernet according to an embodiment of the present invention.

FIG. 2b is a schematic diagram of service transmission on flexible Ethernet according to an embodiment of the present invention. As shown in FIG. 2b, a service is sent from a customer device Cb to a customer device Ca, and a process reverse to that in FIG. 2a is executed. For example, a step performed by Pc in FIG. 2b is the same as a step performed by Pa in FIG. 2a, and a step performed by Pa in FIG. 2b is the same as a step performed by Pc in FIG. 2a.

The following uses an example to describe a principle of identifying a quantity of inserted or deleted idle units in the embodiments of the present invention. A data format of an original data flow may include a data format obtained after coding, or may include a data format without coding. A format of an idle unit may include an idle block, an idle byte unit, or the like.

The Data Format Obtained after Coding is Described by Using 64B/66B Coding as an Example.

Figure 3:
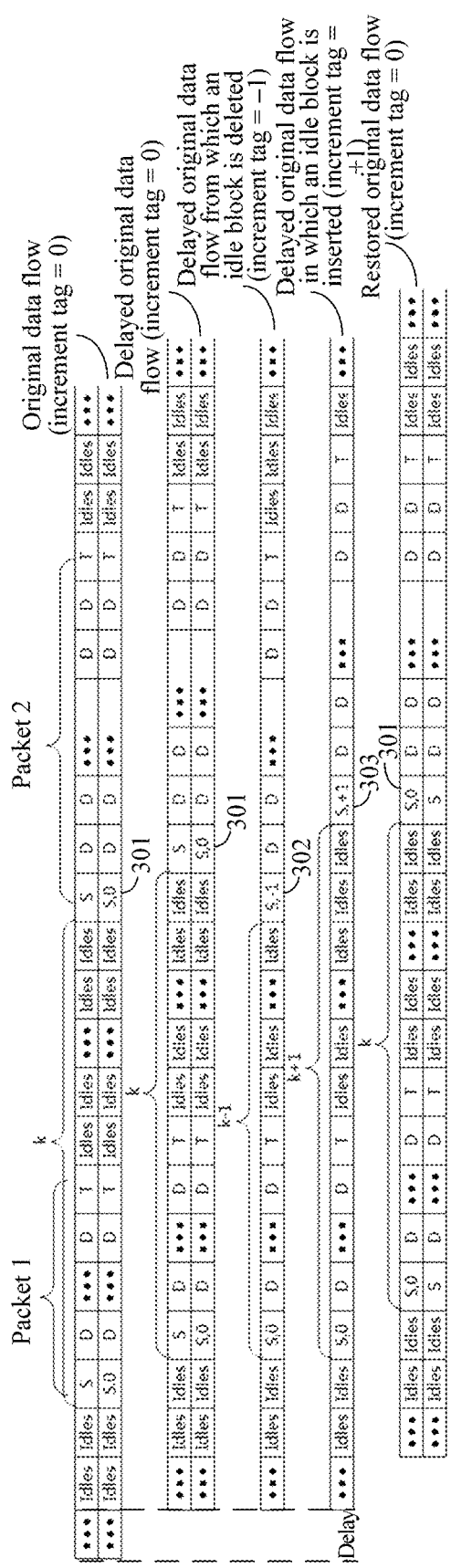
FIG. 3 is a schematic diagram of a format of a data flow according to an embodiment of the present invention.

FIG. 3 is a schematic diagram of a format of a data flow according to an embodiment of the present invention. As shown in FIG. 3, in an original data flow, a start block S, an end block T, and a plurality of blocks D are considered as a packet, and there may be a plurality of idle blocks between any two packets. An idle block may also exist in a packet. FIG. 3 includes a packet 1 and a packet 2. The packet 1 and the packet 2 may be adjacent packets. Alternatively, there may be another packet between the packet 1 and the packet 2. A block between a start block of the packet 1 and a start block of the packet 2 is considered as a segment data flow with a length of k (including the start block of the packet 1 and excluding the start block of the packet 2). In this embodiment of the present invention, the segment data flow k does not include the start block of the packet 2, or certainly, may include the start block of the packet 2. This is not limited in the present invention.

After receiving the original data flow, a transmit-end device may further delay the original data flow. For example, FIG. 3 shows a delay by one block. After delaying the original data flow, the transmit-end device or an intermediate device may insert or delete an idle block. For example, in FIG. 3, one Idle is deleted, and one Idle is inserted. An increment tag p may be inserted in the original data flow, to identify a quantity of inserted or deleted Idles in a data flow, obtained after the idle block is inserted or deleted, relative to the original data flow. For example, when no Idle is inserted in or deleted from the original data flow, an increment tag p inserted in a block 301 is 0; when one Idle is deleted from the original data flow, an increment tag p inserted in a block 302 is −1; or when one Idle is inserted in the original data flow, an increment tag p inserted in a block 303 is +1. A receive-end device restores, to the original data flow, the data flow obtained after the idle block is inserted or deleted.

Figures 4, 5, 6:
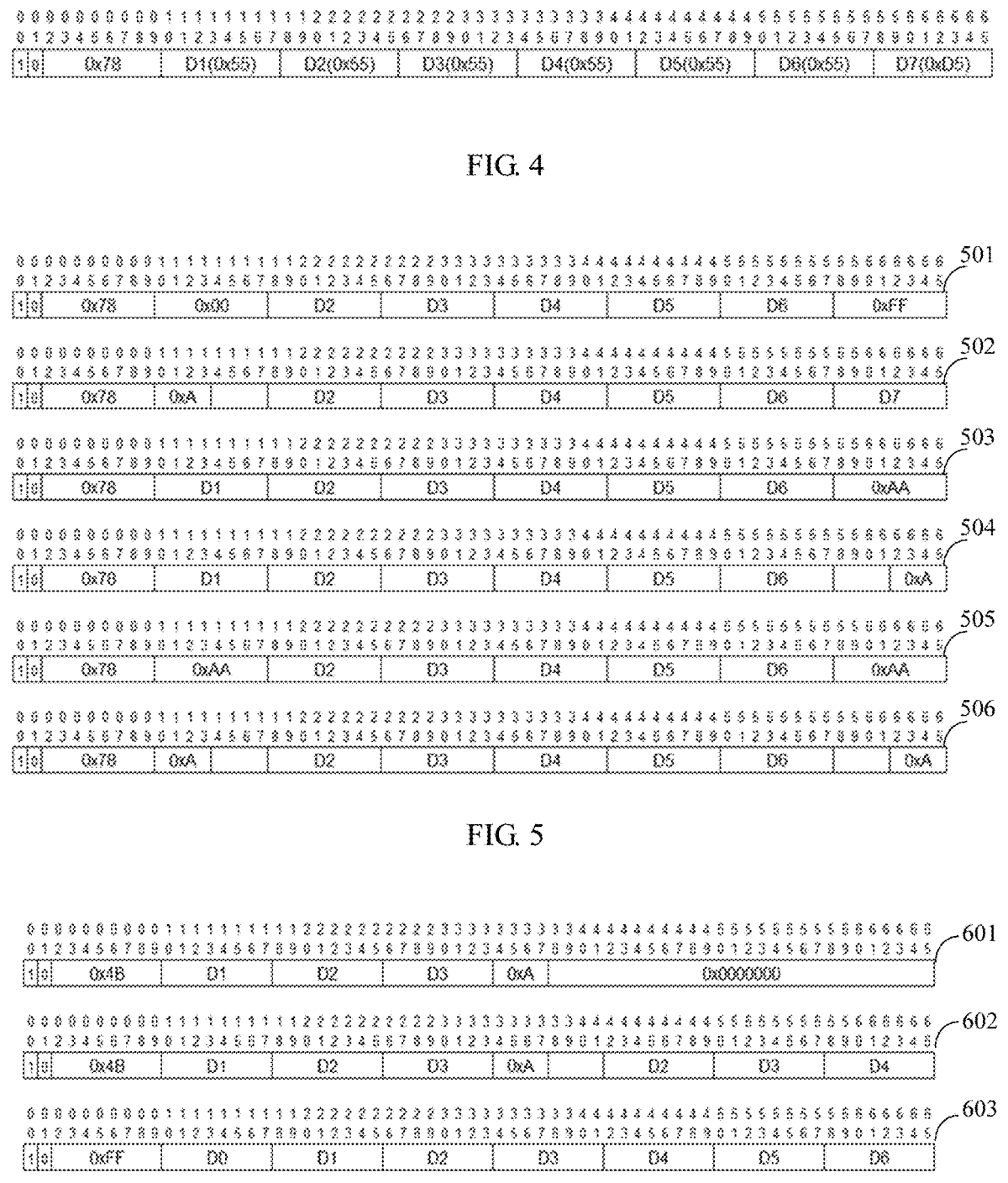

A start block in an Ethernet (including flexible Ethernet) data frame is a block with a fixed bit pattern, and does not change in a transmission process. Therefore, the start block includes redundant information and may be used to carry information such as an increment tag p. For example, on a media independent interface (MII), a preamble element includes 8-byte transmit (character) data (TXD) or received (character) data (RXD), and is indicated by using 8-bit transmit (character) control (signals) (TXC) or received (character) control (signals) (RXC). For example, <TXC, TXD> of the preamble element is <1, 0xFB> <0, 0x55> <0, 0x55> <0, 0x55> <0, 0x55> <0, 0x55> <0, 0x55> <0, 0xD5>. 0xFB is a start-of-frame control character "/S/". 0xD5 is a start-of-frame delimiter (Start-of-Frame Delimiter, SFD). A preamble element in a data format obtained after coding is referred to as a start block. A boundary of an 8-byte preamble element is aligned with a boundary of a 64B/66B block. For example, "/S/" is aligned with a boundary of the start block. FIG. 4 is a schematic diagram of a 64B/66B coding format of a start block according to an embodiment of the present invention. The start block includes a synchronization header "10" and a control block type "0x78".

By inserting an increment tag p in a start block, the start block may be changed to a block that is identified by using a preset pattern. FIG. 5 is a schematic diagram of formats of six types of blocks according to an embodiment of the present invention. For example, based on the start block shown in FIG. 4, in a block 501, "0x55" of D1 is changed to "0x00", and "0xD5" of D7 is changed to "0xFF"; in a block 502, D1 is changed to "0xA"; in a block 503, D7 is changed to "0xAA"; in a block 504, D7 is changed to "0xA"; in a block 505, D1 is changed to "0xAA", and D7 is changed to "0xAA"; and in a block 506, D1 is changed to "0xA", and D7 is changed to "0xA". In the foregoing six types of blocks, D2, D3, D4, D5, and D6 may be used to carry an increment tag p. Alternatively, another preset pattern may be used to identify a block. FIG. 6 is a schematic diagram of formats of three types of blocks according to an embodiment of the present invention. As shown in FIG. 6, block formats of blocks 601 and 602 are identified by using a preset pattern "0x4B+0xA", and in a block 603, a control block type "0x78" is changed to "0xFF". A specific implementation is not limited to the block formats shown in FIG. 5 and FIG. 6, provided that a start block carrying p can be identified.

Figure 7:
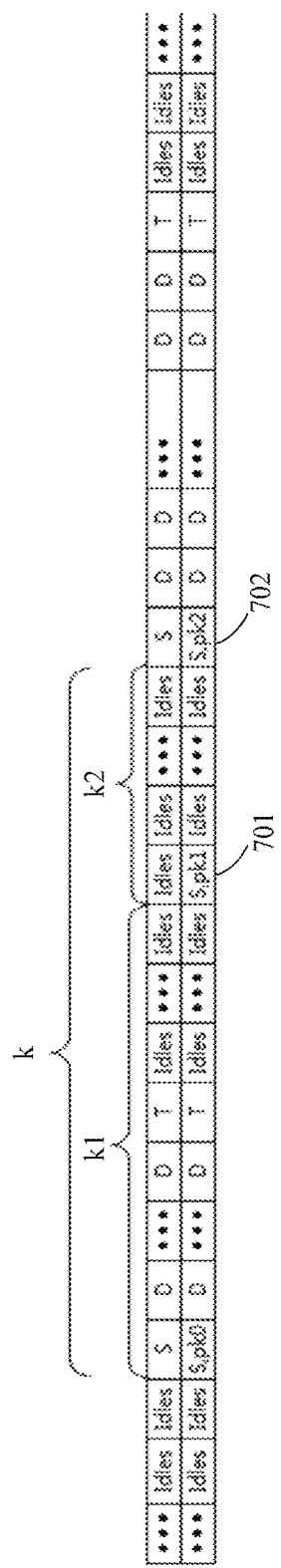
FIG. 7 is a schematic diagram of a format of a data flow according to an embodiment of the present invention.

To reduce a processing delay and cache space, segmentation may be further performed based on FIG. 3. FIG. 7 is a schematic diagram of a format of a data flow according to an embodiment of the present invention. As shown in FIG. 7, a data flow with a length of k is divided into two segments, whose lengths are k1 and k2. An increment tag pk1 may be inserted in a first block 701 (an idle block) that is after the segment k1, to identify a quantity of inserted or deleted idle blocks in the segment k1. An increment tag pk2 may be inserted in a first block 702 (a start block) that is after the segment k2, to identify a quantity of inserted or deleted idle blocks in the segment k2. When the increment tags pk1 and pk2 are inserted in the idle block and the start block respectively, the idle block and the start block may be changed to blocks identified by using a preset pattern. Refer to the embodiments shown in FIG. 5 and FIG. 6. Details are not described herein again. Optionally, the idle block 701 carrying pk1 and the start block 702 carrying pk2 may be identified by using different preset patterns, so that a receive-end device quickly restores original blocks. A start block and an end block usually come in pairs, to satisfy a pairing relationship between a character "/S/" in the start block and a character "/T/" in the end block. Therefore, the idle block in which the increment tag pk1 is inserted may be considered as a start block of a packet. Optionally, any idle block following the block carrying pk1 may be set as an end block.

Figure 8:
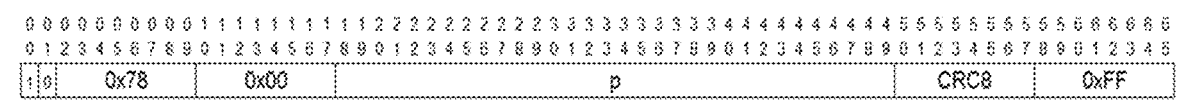

To ensure reliability of the increment tags p, pk1, pk2, and the like, fields, such as the increment tags p, pk1, and pk2, may be further checked. For example, FIG. 8 shows a block format. A cyclic redundancy check (Cyclic Redundancy Check, CRC) parity bit, such as CRC8, is set for an increment tag p, so that a receive-end device verifies transmission reliability.

Increment tags may be inserted in all or some start blocks in an original data flow. Inserting an increment tag in a start block or an idle block is actually replacing the start block or the idle block with a block carrying the increment tag. The start block or the idle block may be first changed to a block identified by a preset pattern, and then the increment tag is inserted in the block identified by the preset pattern. Alternatively, the increment tag may be first inserted in the start block or the idle block, and then a start block or an idle block in which the increment tag is inserted is changed to a block identified by a preset pattern. Alternatively, a block that is identified by a preset pattern and that carries the increment tag may be directly inserted in a location of the start block or the idle block. This is not limited in the present invention.

The Data Format without Coding is Described by Using a Data Format in which Insertion or Deletion is Performed with a Granularity of 4 Bytes.

Figure 9:
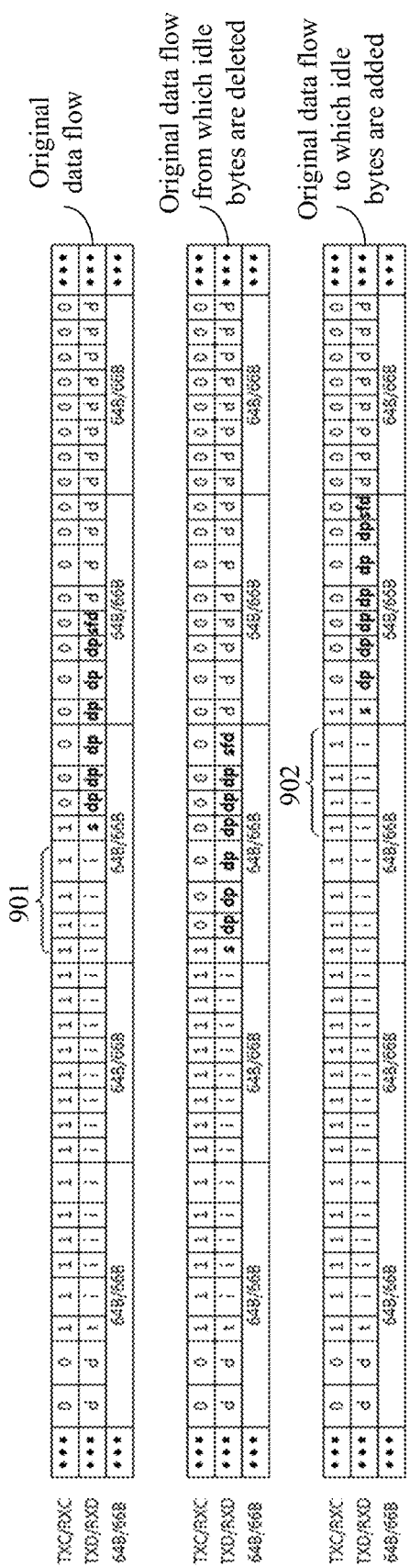
FIG. 9 is a schematic diagram of a format of a data flow according to an embodiment of the present invention.

For the data format without coding, an idle unit may include a plurality of idle bytes. For example, an idle byte may be inserted or deleted based on an idle unit with a granularity of 4 bytes or 8 bytes. 8 bytes may be corresponding to a 64B/66B block. Therefore, a processing manner is similar to that after coding. FIG. 9 is a schematic diagram of a format of a data flow according to an embodiment of the present invention. As shown in FIG. 9, MII byte data flows <TXC/RXC, TXD/RXD> and 64B/66B blocks are in a one-to-one correspondence. For example, eight idle bytes "/i/" are corresponding to an idle block, eight data bytes "/d/" are corresponding to a data block, and eight bytes whose start location is a start-of-frame control character "/S/" are corresponding to a start block. FIG. 9 shows three cases. In a first case, in an original data flow, a start-of-frame control character "/S/" is corresponding to a fifth location of a 64B/66B block. In a second case, four idle bytes 901 are deleted based on an original data flow, and a start-of-frame control character "/S/" is corresponding to a first location of a 64B/66B block. In a third case, four idle bytes 902 are inserted based on an original data flow, and a start-of-frame control character "/S/" is corresponding to a first location of a 64B/66B block.

Figure 10:
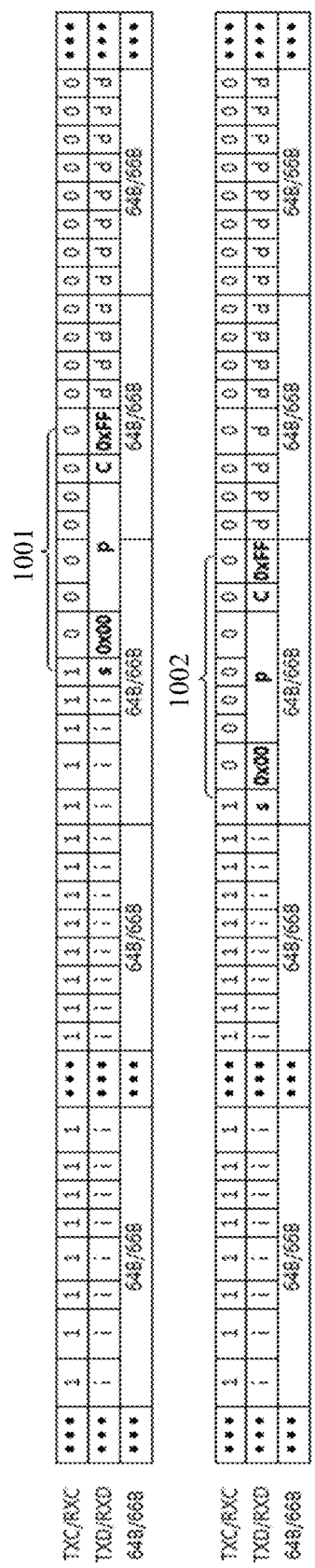
FIG. 10 is a schematic diagram of a format of a data flow according to an embodiment of the present invention.

FIG. 10 is a schematic diagram of a format of a data flow according to an embodiment of the present invention. As shown in FIG. 10, an increment tag p is inserted in the data flow. The increment tag p may identify a quantity of inserted or deleted idle bytes by using a unit of a byte, 4 bytes, or 8 bytes. In FIG. 10, the increment tag p is inserted in an 8-byte unit 1001 or 1002 (referred to as a preamble element byte unit) in which a start-of-frame control character "/S/" of an original data flow is located. That is, the increment tag p may identify a quantity of inserted or deleted idle bytes in a segment data flow that is before the preamble element byte unit. In FIG. 10, a start-of-frame control character "/S/" of the 8-byte unit 1001 is corresponding to a fifth location of a 64B/66B block, and a start-of-frame control character "/S/" of the 8-byte unit 1002 is corresponding to a first location of a 64B/66B block. In addition, the 8-byte unit carrying p may be identified by using a preset byte such as "0x00" or "0xFF". Optionally, a field C (CRC) may be further used to check a field k.

Figure 11:
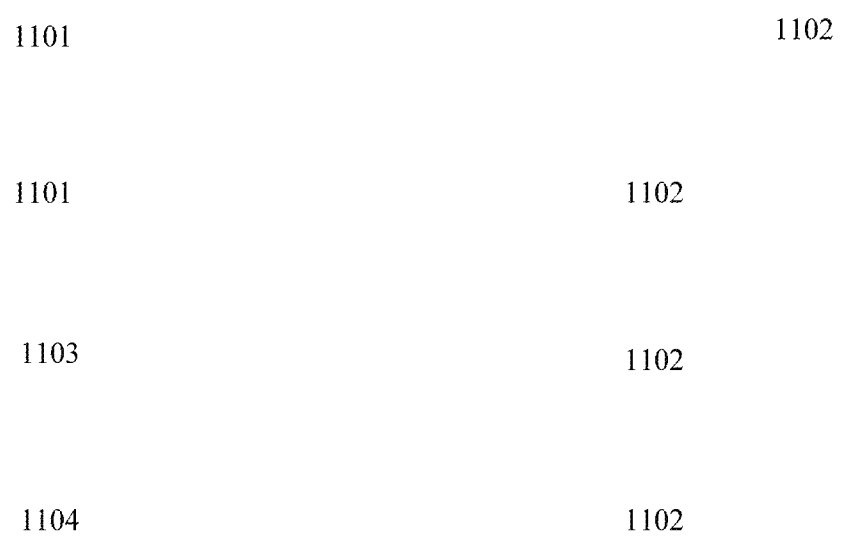

To reduce a processing delay and cache space, based on FIG. 10 and with reference to the method shown in FIG. 7, the data flow with a length of k may be further segmented into two data flows whose lengths are k1 and k2. FIG. 11 is a schematic diagram of a format of a data flow according to an embodiment of the present invention. As shown in FIG. 11, an increment tag pk1 may be inserted in a first 8-byte unit 1101, 1103, or 1104 (an idle byte unit) that is after the segment k1, to identify a quantity of inserted or deleted idle bytes in the segment k1. An increment tag pk2 is inserted in a first 8-byte unit 1102 (a preamble element byte unit) that is after the segment k2, to identify a quantity of inserted or deleted idle bytes in the segment k2. A start control character "/S/" may be corresponding to a first location or a fifth location of a 64B/66B block. The 8-byte unit carrying pk1 may be identified by using a preset byte. For example, "0xFF" or "0x00" is used for the 8-byte unit 1101, and bytes such as "0x9C" and "0xF0" are respectively used for the 8-byte units 1103 and 1104. The 8-byte unit 1102 carrying pk2 may be identified by using a preset byte such as "0x00" or "0xFF". Optionally, the idle byte unit carrying pk1 and the preamble element byte unit carrying pk2 may be identified by using different preset bytes, so that a receive-end device quickly restores original 8-byte units. Optionally, a field C (CRC) may be further used to check the fields pk1 and pk2.

Increment tags may be inserted in all or some preamble element byte units in an original data flow. Inserting an increment tag in a preamble element byte unit or an idle byte unit is actually replacing the preamble element byte unit or the idle byte unit with a unit carrying the increment tag. A preset byte may be first inserted in the preamble element byte unit or the idle byte unit, and then the increment tag is inserted in a unit identified by the preset byte. Alternatively, the increment tag may be first inserted in the preamble element byte unit or the idle byte unit, and then a preset byte is inserted in a preamble element byte unit or an idle byte unit in which the increment tag is inserted. Alternatively, a unit carrying the increment tag and a preset byte may be directly inserted in a location of the preamble element byte unit or the idle byte unit. This is not limited in the present invention.

Figure 12:
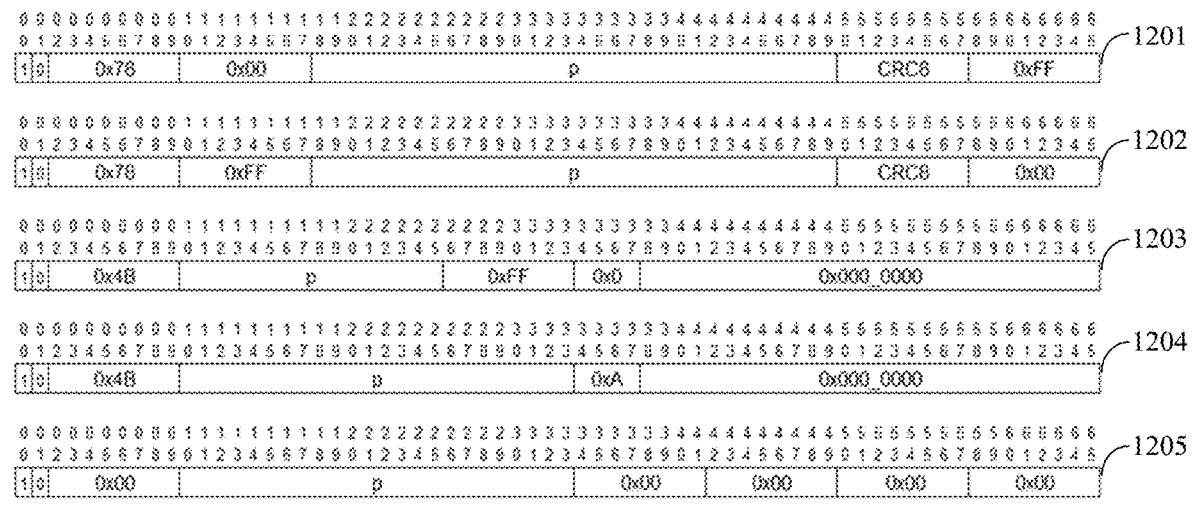

An 8-byte MII byte data flow is in a correspondence with a 64B/66B block. Therefore, the 8-byte unit carrying pk1 and the 8-byte unit carrying pk2 may be corresponding to block formats shown in FIG. 12. As shown in FIG. 12, the 8-byte units 1001 and 1002 in FIG. 10 and the 8-byte unit 1102 in FIG. 11 may be corresponding to a block 1201. The 8-byte unit 1101 in FIG. 11 may be corresponding to a block 1202. The 8-byte unit 1103 in FIG. 11 may be corresponding to a block 1203. The 8-byte unit 1104 in FIG. 11 may be corresponding to a block 1204 or 1205.

It can be learned that the increment tags p, pk1, and pk2 may be represented by using field lengths such as 3 bits, 4 bits, and 8 bits. For example, when a 3-bit length is used, a represented range includes −4 to +3; when a 4-bit length is used, a represented range includes −8 to +7; and so on. Different bit lengths may be selected according to a length of a segment data flow.

In the embodiments of the present invention, an original data flow is divided into a plurality of segment data flows. For each segment data flow, a data unit in which an increment tag can be inserted is searched for, for example, a start unit or an idle unit. The data unit in which an increment tag can be inserted may be in an adjacent location of the identified segment data flow, or may be in a non-adjacent location. The data unit in which an increment tag can be inserted may be located before the identified segment data flow, or may be located after the identified segment data flow. This is not limited in the present invention. In addition, the data unit in which an increment tag can be inserted may identify a start location of the segment data flow, or may be used to identify an end location of the segment data flow. For example, any start block may identify a start location of a segment data flow in which the start block is located, or may identify an end location of a previous segment data flow.

Figure 13:
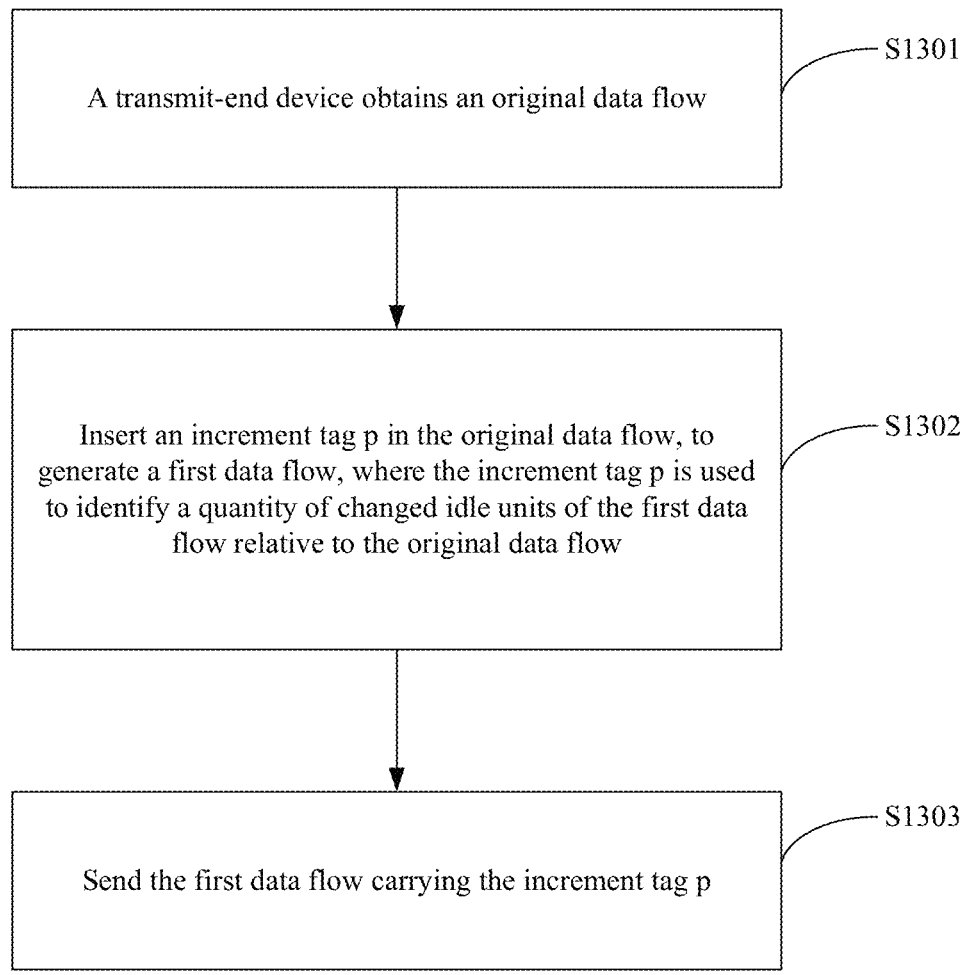
FIG. 13 is a demonstrative flowchart of a service sending method according to an embodiment of the present invention.

Referring to the foregoing principle of identifying a quantity of inserted or deleted idle units, the following describes the embodiments of the present invention from a processing procedure. FIG. 13 is a demonstrative flowchart of a service sending method according to an embodiment of the present invention. As shown in FIG. 13, the method may be executed by a transmit-end device on flexible Ethernet, and includes the following steps.

S1301. A transmit-end device obtains an original data flow.

In this embodiment of the present invention, the original data flow may be a service data flow including an interpacket gap (Interpacket Gap, IPG), such as an Ethernet packet service data flow. The IPG may be an idle unit and has a plurality of data formats. For example, the IPG includes an idle packet at a Media Access Control (Media Access Control, MAC) layer or above, an MII idle byte unit, or an idle block having a physical layer coding format. For example, a coding format of the idle block is 64B/66B coding, 8B/10B coding, or 512B/514B coding.

S1302. Insert an increment tag p in the original data flow, to generate a first data flow, where the increment tag p is used to identify a quantity of changed idle units of the first data flow relative to the original data flow. For example, the increment tag p may identify a quantity of inserted or deleted idle units of the first data flow relative to the original data flow. An idle unit may be inserted in or deleted from the first data flow for a plurality of times. Each time an idle unit is inserted or deleted, the increment tag p is updated correspondingly, so that a receive-end device obtains a result of a last update.

S1303. Send the first data flow carrying the increment tag p.

This embodiment of the present invention is mainly described by using examples in which the flexible Ethernet bears a 40 GE service and a 10 GE service. Processing procedures of a service of 100 GE or above and a 40 GE service are similar. Processing procedures of a 25 GE service and a 10 GE service are similar.

40 GE Service

Figure 14:
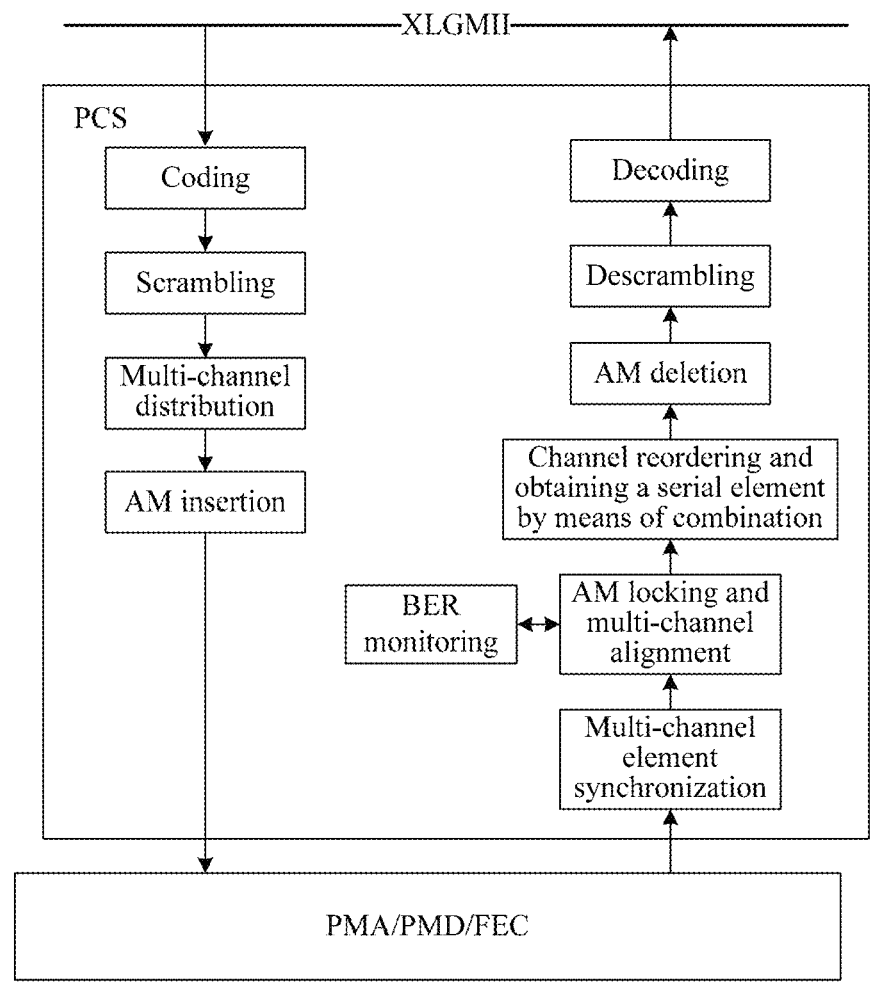
FIG. 14 is a schematic diagram of a data processing procedure of a 40 GE physical interface according to an embodiment of the present invention.

To describe the technical solution in this embodiment of the present invention more clearly, a 40 GE physical interface is briefly described first. An MII of a 40 GE physical interface is referred to as a 40 Gbps media independent interface (40 Gbps Media Independent Interface, XLGMII). The XLGMII inherits an external clock frequency and time phase of the 40 GE physical interface, and has a nominal rate of 40 Gbps/64×(16383/16384)=625×(16383/16384) MHz. FIG. 14 is a schematic diagram of a data processing procedure of a 40 GE physical interface according to an embodiment of the present invention. As shown in FIG. 14, a physical layer structure of the 40 GE physical interface includes a physical coding sublayer (PCS) and a physical medium attachment (PMA)/physical medium dependent (PMD)/forward error correction (FEC) sublayer. The physical layer structure of the 40 GE physical interface further includes a reconciliation sublayer (RS) that is not shown in the figure. The XLGMII interface is located between the RS and the PCS. Processing steps in a sending direction of the PCS may include coding, scrambling, multi-channel distribution, alignment marker (AM) insertion, and the like. Processing steps in a receiving direction of the PCS may include multi-channel element synchronization, AM locking and channel alignment, bit error rate (BER) monitoring, channel reordering and obtaining a serial element through combination, AM deletion, descrambling, decoding, and the like. For the processing steps shown in FIG. 14, refer to the prior art. In the sending direction, after receiving a data flow from the XLGMII interface, the PCS needs to distribute the data flow to a plurality of channels (multi-channel distribution), and insert an AM in each channel (AM insertion). In the receiving direction, before sending a data flow to the XLGMII interface, the PCS receives data flows from a plurality of channels, aligns and reorders the data flows of the plurality of channels, restores a serial data flow (multi-channel element synchronization, AM locking and channel alignment, channel reordering and obtaining a serial element through combination), deletes an AM from each channel (AM deletion), and then performs descrambling and decoding.

Figure 15:
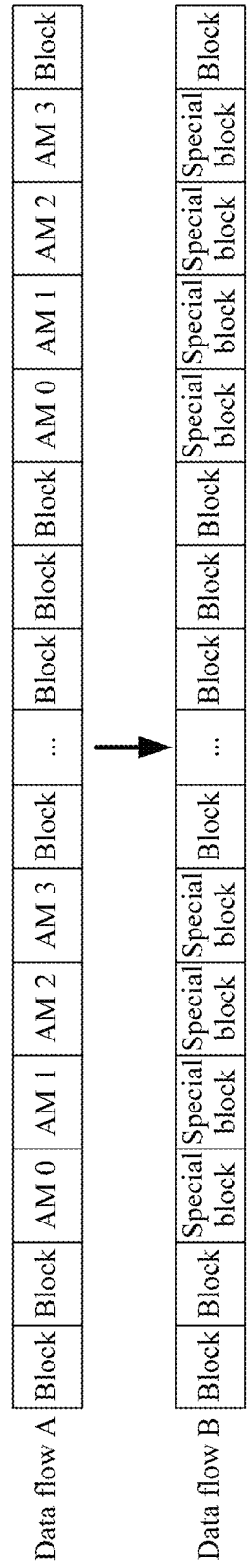
FIG. 15 is a schematic diagram of AM format conversion according to an embodiment of the present invention.
Figure 16:
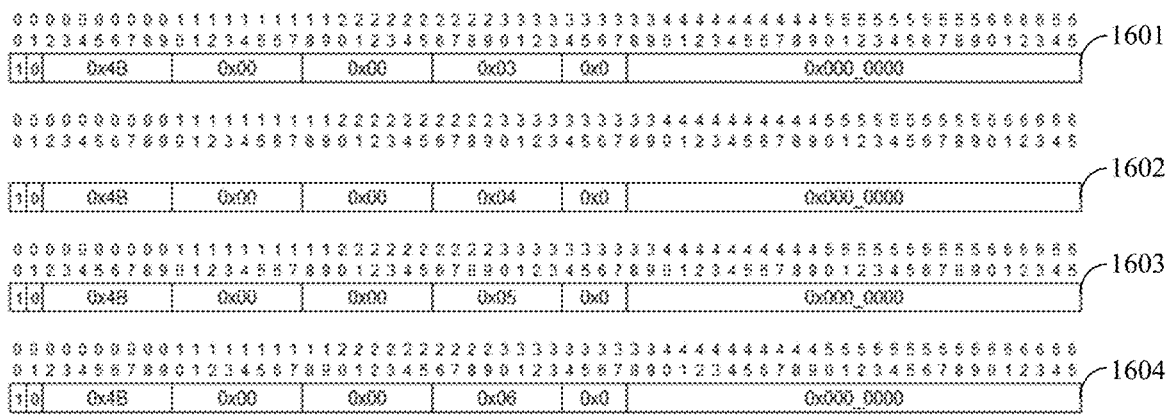
FIG. 16 is a schematic diagram of formats of four types of blocks according to an embodiment of the present invention.

The original data flow may be received from the 40 GE physical interface. Then, step S1302 may be performed after the descrambling in the receiving direction of the 40 GE physical interface, and may be performed before or after the decoding. This embodiment of the present invention may be implemented based on the data processing procedure shown in FIG. 14, but is not limited to the example shown in FIG. 14. For example, the data processing procedure may not include the AM deletion step. FIG. 15 is a schematic diagram of AM format conversion according to an embodiment of the present invention. As shown in FIG. 15, after AM locking and multi-channel alignment, an AM block may be replaced with a special block, such as one of four types of blocks shown in FIG. 16. As shown in FIG. 16, an AM0, an AM1, an AM2, and an AM3 are replaced with blocks 1601, 1602, 1603, and 1604 respectively. Alternatively, an AM0, an AM1, an AM2, and an AM3 may be replaced with four same blocks, for example, any one of the foregoing four types of blocks.

Figure 17:
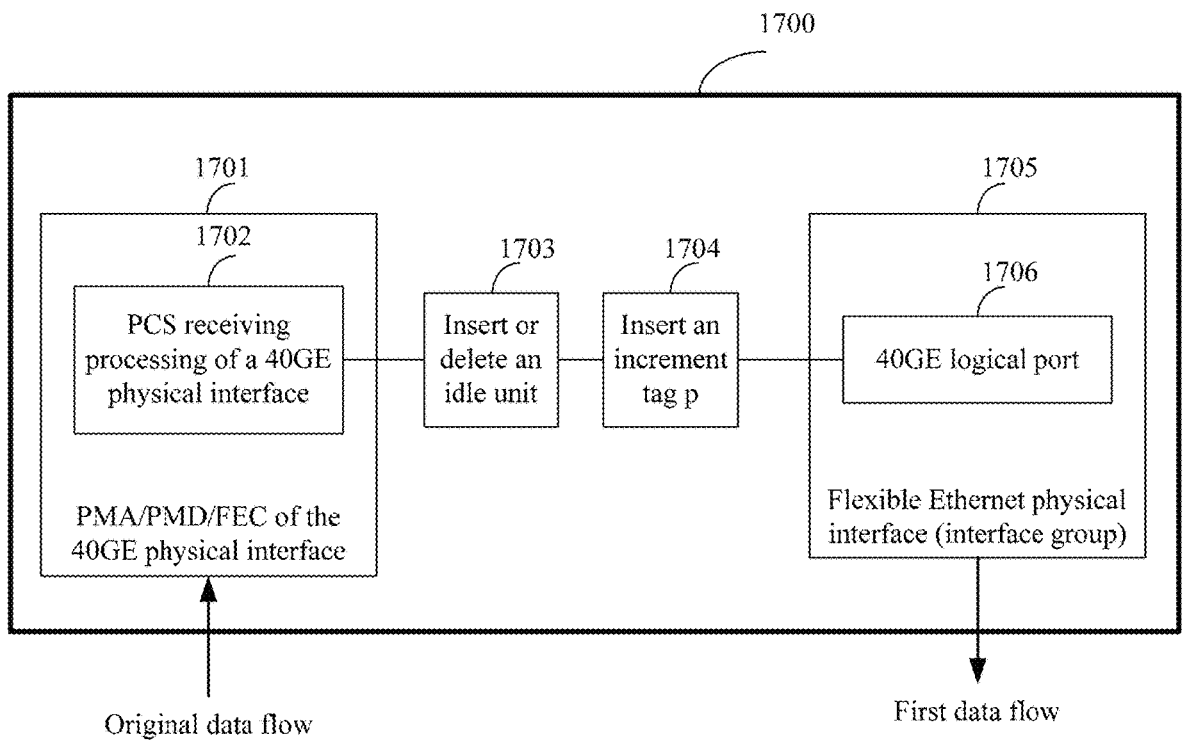
FIG. 17 is a schematic structural diagram of a transmit-end device according to an embodiment of the present invention.

FIG. 17 is a schematic structural diagram of a transmit-end device 1700 according to an embodiment of the present invention. As shown in FIG. 17, the transmit-end device 1700 receives an original data flow by using PMA/PMD/FEC 1701 of a 40 GE physical interface. For PCS receiving processing 1702 of the 40 GE physical interface, refer to the processing steps in the receiving direction shown in FIG. 14. Increment tag p insertion 1704 may be implemented in a process of the PCS receiving processing 1702, or may be implemented after the PCS receiving processing 1702. Optionally, before the increment tag p insertion 1704, idle unit insertion/deletion 1703 may be performed for rate adaptation. Then, a first data flow in which an increment tag p is inserted may be sent by using a 40 GE logical port 1706 formed by a flexible Ethernet physical interface (or interface group) 1705.

10 GE Service

Figure 18:
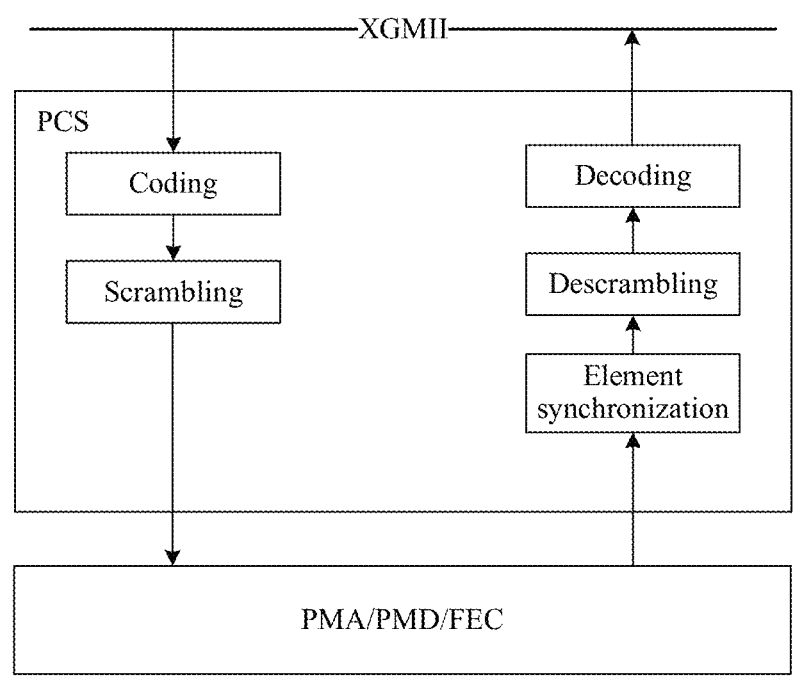
FIG. 18 is a schematic diagram of a data processing procedure of a 10 GE physical interface according to an embodiment of the present invention.

FIG. 18 is a schematic diagram of a data processing procedure of a 10 GE physical interface according to an embodiment of the present invention. An MII of the 10 GE physical interface is referred to as an XGMII. A data bit width of the XGMII includes 32 bits, and a start-of-frame control character is aligned with a boundary of 4 bytes, that is, the start-of-frame control character may be in a fifth location or a first location of a 64B/66B block. As shown in FIG. 18, a physical layer structure of the 10 GE physical interface is similar to that of a 40 GE physical interface. Processing steps in a sending direction of a PCS may include coding and scrambling. Processing steps in a receiving direction of the PCS may include element synchronization, descrambling, and decoding. At present, flexible Ethernet is based on a 100 GE physical interface, and time division multiplexing (TDM) is performed according to a 64B/66B block, to obtain logical ports through division. Therefore, a block type needs to be converted for a 10 GE service. That is, in the receiving direction of the PCS, decoding (for example, 64B/66B decoding) is performed first, and then an idle byte is inserted or deleted based on an MII byte data flow obtained after decoding. For example, if a start-of-frame control character is in a fifth location of a 64B/66B block, a data flow as a whole may be moved forward or backward by 4 bytes by inserting or deleting an idle byte, so that the start-of-frame control character is aligned with a boundary of the 64B/66B block.

The original data flow may be received from the 10 GE physical interface. Then, step S1302 may be performed after or before the decoding in the receiving direction of the 10 GE physical interface. This embodiment of the present invention may be implemented based on the data processing procedure shown in FIG. 18, but is not limited to the example shown in FIG. 18. For example, the data processing procedure may not include the decoding step, and then S1302 may be performed after the descrambling.

Figure 19:
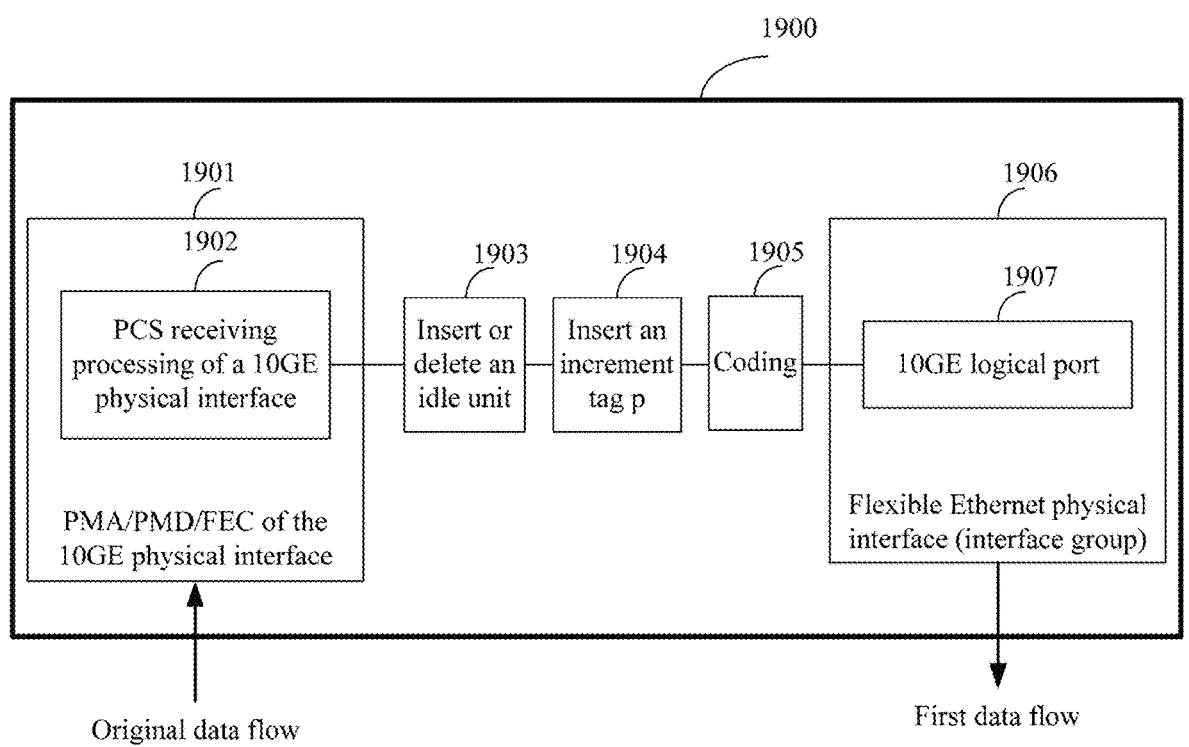
FIG. 19 is a schematic structural diagram of a transmit-end device according to an embodiment of the present invention.

FIG. 19 is a schematic structural diagram of a transmit-end device 1900 according to an embodiment of the present invention. As shown in FIG. 19, the transmit-end device 1900 receives an original data flow by using PMA/PMD/FEC 1901 of a 10 GE physical interface. For PCS receiving processing 1902 of the 10 GE physical interface, refer to the processing steps in the receiving direction shown in FIG. 18. Increment tag p insertion 1904 may be implemented in a process of the PCS receiving processing 1902, or may be implemented after the PCS receiving processing 1902. Optionally, before the increment tag p insertion 1904, idle unit insertion/deletion 1903 may be performed for rate adaptation. Then, a first data flow in which an increment tag p is inserted is coded, and is sent by using a 10 GE logical port 1907 formed by a flexible Ethernet physical interface (or interface group) 1906. Optionally, the idle unit insertion/deletion 1903 and the increment tag p insertion 1904 may be performed before or after coding 1905. If decoding is not included in the PCS receiving processing, no coding is required herein either.

Before S1302, the transmit-end device may insert or delete an idle unit in the original data flow, to adapt to a rate difference between different physical interfaces or logical ports. In a process of inserting or deleting an idle unit, specific cache space needs to be set. In a process of bearing a service by flexible Ethernet, there may be a case in which a queue water mark is relatively high but no idle unit can be deleted, or a queue water mark is relatively low but no idle unit can be inserted. Therefore, cache space, that is, a cache queue depth, needs to be set properly, so that the cache space can support a water mark change, for example, ±3 idle units. A flexible Ethernet device, such as a transmit-end device, receives original data according to an upstream clock, caches the original data, and sends cached data according to a downstream clock. During enqueue of a cache queue, an idle unit may be inserted or deleted and an increment tag p may be inserted. Then during dequeue, the cached data only needs to be sent according to the downstream clock. Alternatively, during dequeue of a cache queue, an idle unit may be inserted or deleted and an increment tag p may be inserted. Then during enqueue, the original data is received according to the upstream clock and is cached. The following provides descriptions by using an example in which during enqueue, an idle unit is inserted or deleted and an increment tag p is inserted.

Figure 20:
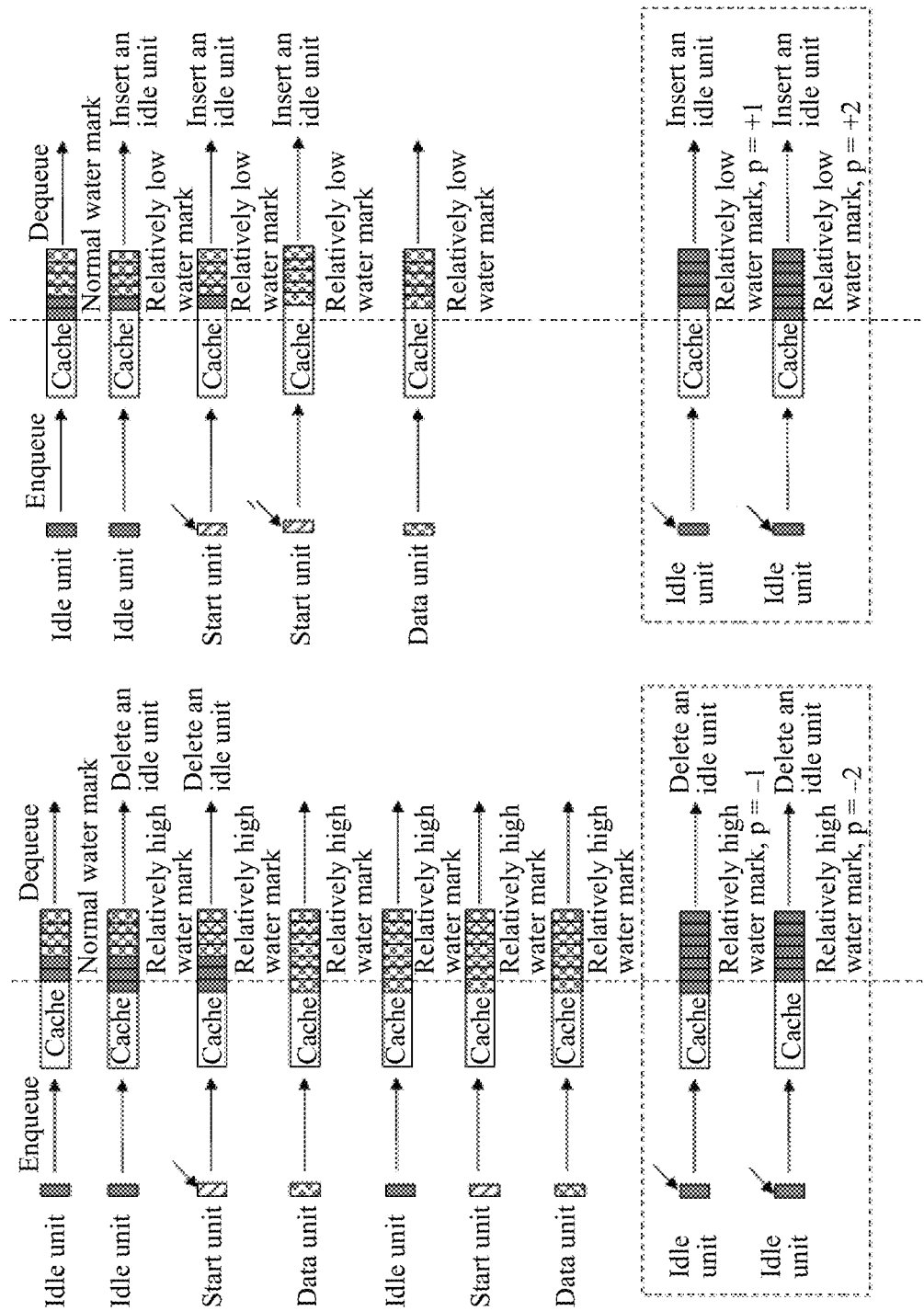
FIG. 20 is a schematic diagram of several enqueue types of a cache queue according to an embodiment of the present invention.

FIG. 20 is a schematic diagram of several enqueue types of a cache queue according to an embodiment of the present invention. FIG. 20 shows some enqueue cases of a cache queue. Actual cases are not limited to the several cases shown in the figure. For example, a queue water mark may be relatively high, relatively low, or normal. When the queue water mark is relatively high, an idle unit needs to be deleted; when the queue water mark is relatively low, an idle unit needs to be inserted; or when the queue water mark is normal, no idle unit needs to be inserted or deleted. In a left column in FIG. 20, when a queue water mark is relatively high and there is an idle unit at a tail (a receive side) of a queue, the idle unit is allowed to be deleted. In a right column in FIG. 20, when a queue water mark is relatively low and data at a tail of a queue is data between packets, an idle unit is allowed to be inserted (for example, an idle unit is allowed to be inserted only between packets). A 64-byte Ethernet packet is corresponding to 10 blocks. A longest frame of 1.5 kbytes includes approximately 192 blocks. A giant frame of 9.6 kbytes includes approximately 1200 blocks. A range of a deviation between two clock frequencies is ±100 ppm. When a difference is 200 ppm, insertion or deletion of an idle unit is corresponding to a segment length of approximately 1/0.0002=5000, and a plurality of packets may be included. When an idle unit is inserted or deleted, an increment tag p may be inserted in a start unit (such as a start block or a preamble element byte unit of a packet). An increment tag p may be inserted in an idle unit if there is no start unit in a long data segment or a start unit carries other information and cannot be used to carry an increment tag p. For example, in a dashed-line box in FIG. 20, after two idle units are deleted, p=−2, and then an increment tag p may be inserted in an idle unit that is currently enqueued. Likewise, after two idle units are inserted, p=+2, and an increment tag p may be inserted in an idle unit that is currently enqueued.

Figure 21:
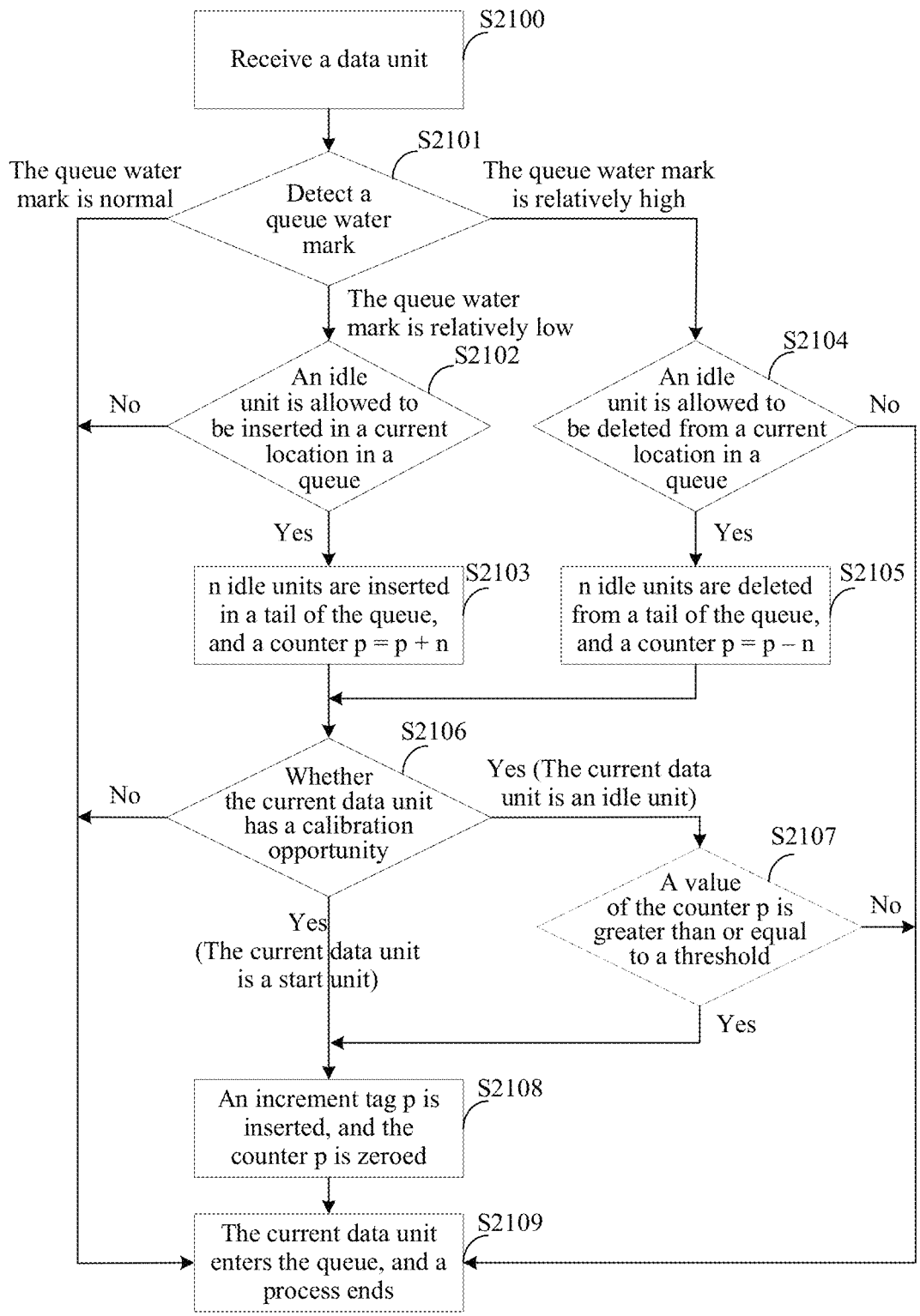
FIG. 21 is a flowchart of an increment tag insertion method according to an embodiment of the present invention.

The following describes how to insert an increment tag p by using an example. FIG. 21 is a flowchart of an increment tag insertion method according to an embodiment of the present invention. As shown in FIG. 21, in S2100, a data unit is received from an original data flow. A data format of the data unit may include a block, a byte, or the like. For example, the data format of the data unit is a block, and data units of the original data flow may include a start block S, an end block T, a block D, and an idle block, and may further include an AM block and the like. In S2101, a current queue water mark is detected, and if the queue water mark is relatively low, S2102 is performed, to determine whether an idle unit is allowed to be inserted in a current location in a queue. If an idle unit is allowed to be inserted in the current location in the queue, S2103 is performed, that is, n (n≥1) idle units are inserted in a tail of the queue, so that the queue water mark becomes normal, and a counter p=p+n. In S2101, a current queue water mark is detected, and if the queue water mark is relatively high, S2104 is performed, to determine whether an idle unit is allowed to be deleted from a current location in a queue. If an idle unit is allowed to be deleted from the current location in the queue, S2105 is performed, that is, n (n≥1) idle units are deleted from a tail of the queue, so that the queue water mark becomes normal, and a counter p=p−n. After S2103 or S2105 is performed, S2106 is performed, to determine whether the current data unit has a calibration opportunity. A case in which the current data unit has a calibration opportunity is that the current data unit is a start unit (for example, a start block or a preamble element byte unit). Then S2108 is performed, that is, an increment tag p is inserted in the current data unit, and the counter p is zeroed. Another case in which the current data unit has a calibration opportunity is that the current data unit is an idle unit. To avoid overusing an idle unit for calibration, a policy for calibrating an idle unit may be further set. For example, in S2107, if an absolute value of the current counter p is greater than or equal to a preset threshold, for example, |P|≥2, S2108 is performed. S2107 is an optional step, and another policy for calibrating an idle unit may be used. For example, a counter k is used to count a quantity of data units that enter, starting from a previous calibration location, the queue. In S2100, it is set that k=k+1. Optionally, in S2107, if a value of the counter k is greater than or equal to a preset threshold, S2108 is performed. Finally, in S2109, the current data unit enters the queue, a process ends, and a next data unit of the original data flow is received. The current data unit is sent into the queue and the process ends in any one of the following cases: The queue water mark is normal, no idle unit is allowed to be inserted in or deleted from the current location in the queue, the current data unit has no calibration opportunity, or a condition of the policy for calibrating an idle unit is not satisfied.

For a threshold setting of the counter p or the counter k, refer to a length of bits carrying the increment tag p. As the length of bits increases, a greater threshold may be set.

The current data unit may be first replaced with a unit in a preset format, and then the increment tag p is inserted. Alternatively, the increment tag p may be inserted first, and then the current data unit is replaced with a unit in a preset format. The increment tag p may be directly inserted in a redundant field or an idle field of the current data unit. For how to insert an increment tag p in a data unit, refer to the foregoing principle of identifying a quantity of inserted or deleted idle units. Details are not described herein again.

In this embodiment of the present invention, the transmit-end device inserts the increment tag p in the original data flow, to identify the quantity of changed idle units of the first data flow, obtained after an idle unit is inserted or deleted, relative to the original data flow. Therefore, the receive-end device can restore the original data flow according to the increment tag p, so as to obtain clock frequency and time phase information of the original data flow. This implements transparent transport of clock frequency and time phase information of a service.

The first data flow sent by the transmit-end device may be transmitted by at least one intermediate device and reach the receive-end device. The intermediate device may insert or delete an idle unit in the first data flow, to adapt to a rate difference in a line. After inserting or deleting an idle unit, the intermediate device needs to update the increment tag p, or may insert a new increment tag. An increment tag inserted or updated by the intermediate device is used to identify a quantity of changed idle units of a data flow, obtained after the present device inserts or deletes an idle unit, relative to the original data flow. A manner of updating or inserting an increment tag by the intermediate device is similar to that by the transmit-end device.

Figure 22:
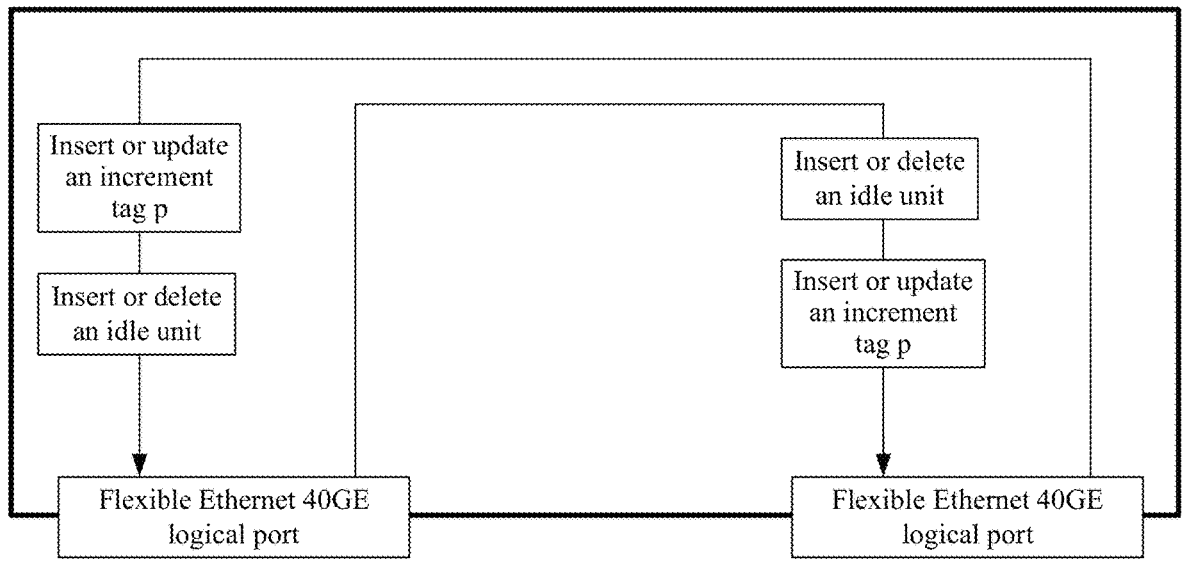
FIG. 22 is a schematic structural diagram of an intermediate device according to an embodiment of the present invention.
Figure 23:
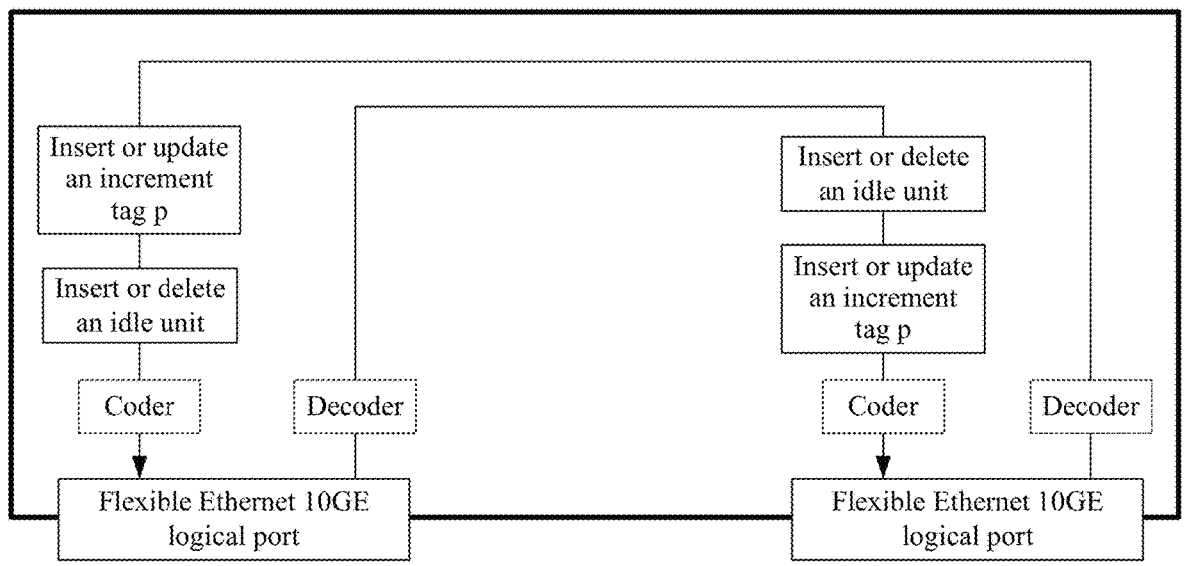
FIG. 23 is a schematic structural diagram of an intermediate device according to an embodiment of the present invention.

FIG. 22 is a schematic structural diagram of an intermediate device according to an embodiment of the present invention. As shown in FIG. 22, the intermediate device receives a first data flow by using one flexible Ethernet 40 GE logical port; performs processing for the first data flow, for example, inserts or deletes an idle unit, and inserts or updates an increment tag p; and sends a processed first data flow by using the other flexible Ethernet 40 GE logical port. FIG. 23 is a schematic structural diagram of an intermediate device according to an embodiment of the present invention. As shown in FIG. 23, the intermediate device receives a first data flow by using one flexible Ethernet 10 GE logical port; performs processing for the first data flow, for example, inserts or deletes an idle unit, and inserts or updates an increment tag p; and sends a processed first data flow by using the other flexible Ethernet 10 GE logical port. Optionally, for a device with a 10 GE logical port, processing, such as inserting or deleting an idle unit and inserting or updating an increment tag p, may be performed after decoding and before coding. A decoder and a coder in FIG. 23 are optional modules, and may be omitted.

Figure 24:
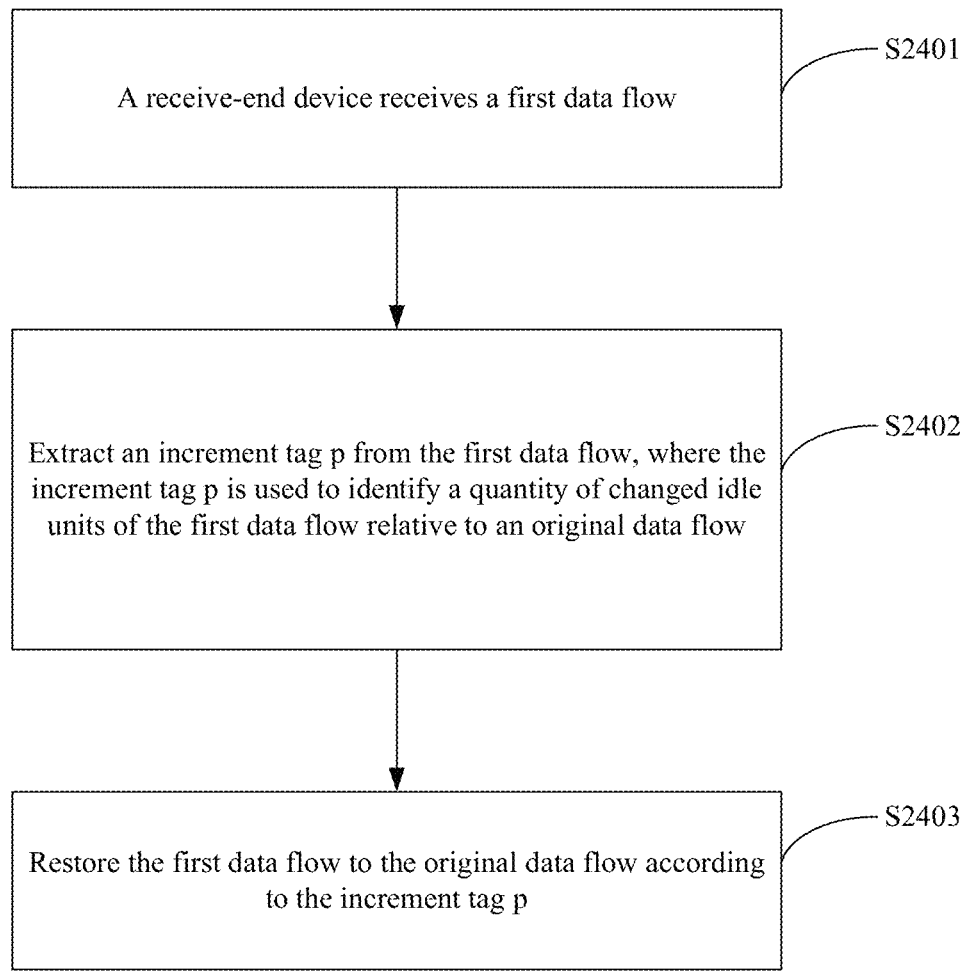
FIG. 24 is a demonstrative flowchart of a service receiving method according to an embodiment of the present invention.

FIG. 24 is a demonstrative flowchart of a service receiving method according to an embodiment of the present invention. As shown in FIG. 24, the method may be executed by a receive-end device on flexible Ethernet, and includes the following steps.

S2401. A receive-end device receives a first data flow.

In this embodiment of the present invention, a data format of the first data flow may be the same as or different from that of an original data flow. For example, the original data flow is an uncoded data flow, and the first data flow is a coded data flow.

S2402. Extract an increment tag p from the first data flow, where the increment tag p is used to identify a quantity of changed idle units of the first data flow relative to an original data flow. For example, the increment tag p may identify a quantity of inserted or deleted idle units of the first data flow relative to the original data flow. An idle unit may be inserted in or deleted from the first data flow for a plurality of times. Each time an idle unit is inserted or deleted, the increment tag p is updated correspondingly, so that the receive-end device obtains a result of a last update.

S2403. Restore the first data flow to the original data flow according to the increment tag p.

This embodiment of the present invention is mainly described by using examples in which the flexible Ethernet bears a 40 GE service and a 10 GE service. Processing procedures of a service of 100 GE or above and a 40 GE service are similar. Processing procedures of a 25 GE service and a 10 GE service are similar.

40 GE Service

This embodiment of the present invention may be implemented based on the data processing procedure shown in FIG. 14, but is not limited to the example shown in FIG. 14. For example, the data processing procedure may not include the AM insertion step. The first data flow may be received from a 40 GE logical port. Then, steps S2402 and S2403 may be performed before scrambling in a sending direction of a 40 GE physical interface, and may be performed before or after coding.

Figure 25:
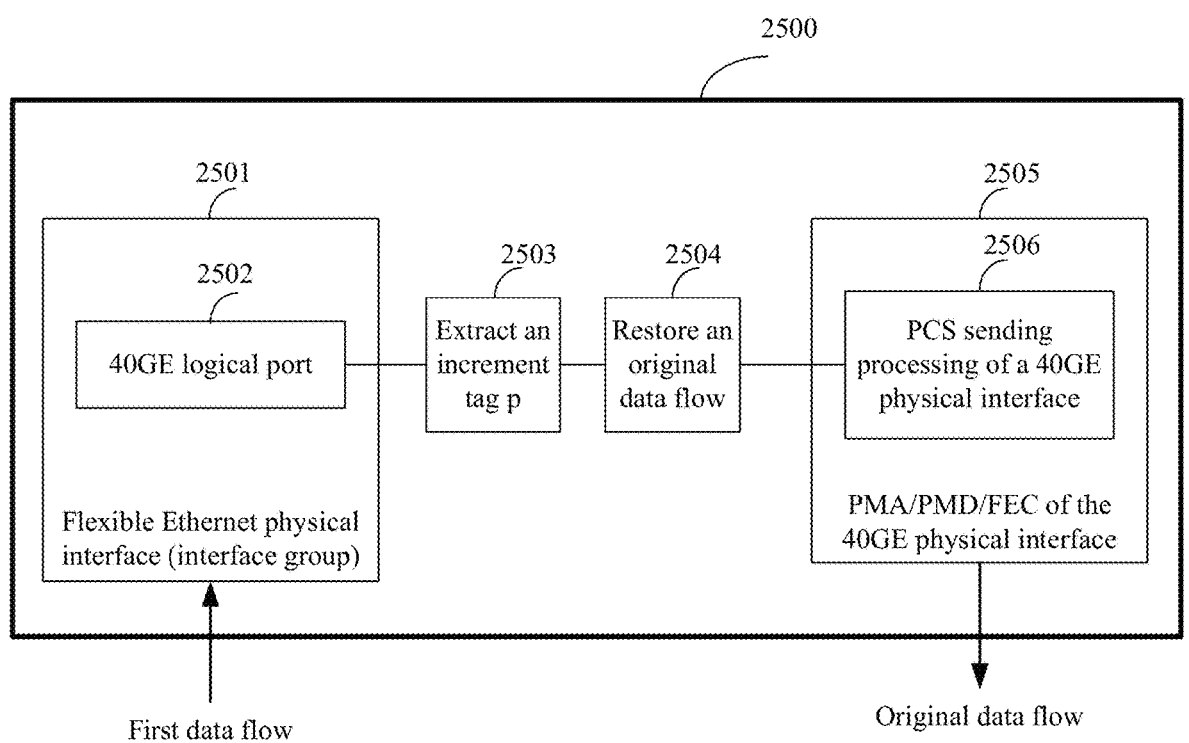
FIG. 25 is a schematic structural diagram of a receive-end device according to an embodiment of the present invention.

FIG. 25 is a schematic structural diagram of another receive-end device 2500 according to an embodiment of the present invention. As shown in FIG. 25, the receive-end device 2500 receives a first data flow by using a 40 GE logical port 2502 formed by a flexible Ethernet physical interface (or interface group) 2501; and after restoring the first data flow to an original data flow, may send, to a customer device by using PMA/PMD/FEC 2505 of a 40 GE physical interface, the restored original data flow. For PCS sending processing 2506 of the 40 GE physical interface, refer to the processing steps in the sending direction shown in FIG. 14. Increment tag p extraction 2503 and original data restoration 2504 may be implemented in a process of the PCS sending processing 2506, may be implemented in the 40 GE logical port 2502, or may be implemented independently.

10 GE Service

This embodiment of the present invention may be implemented based on the data processing procedure shown in FIG. 18, but is not limited to the example shown in FIG. 18. For example, the data processing procedure may not include the coding step. The original data flow may be received from a 10 GE logical port. Then, steps S2402 and S2403 may be performed after or before coding in a sending direction of a 10 GE physical interface.

Figure 26:
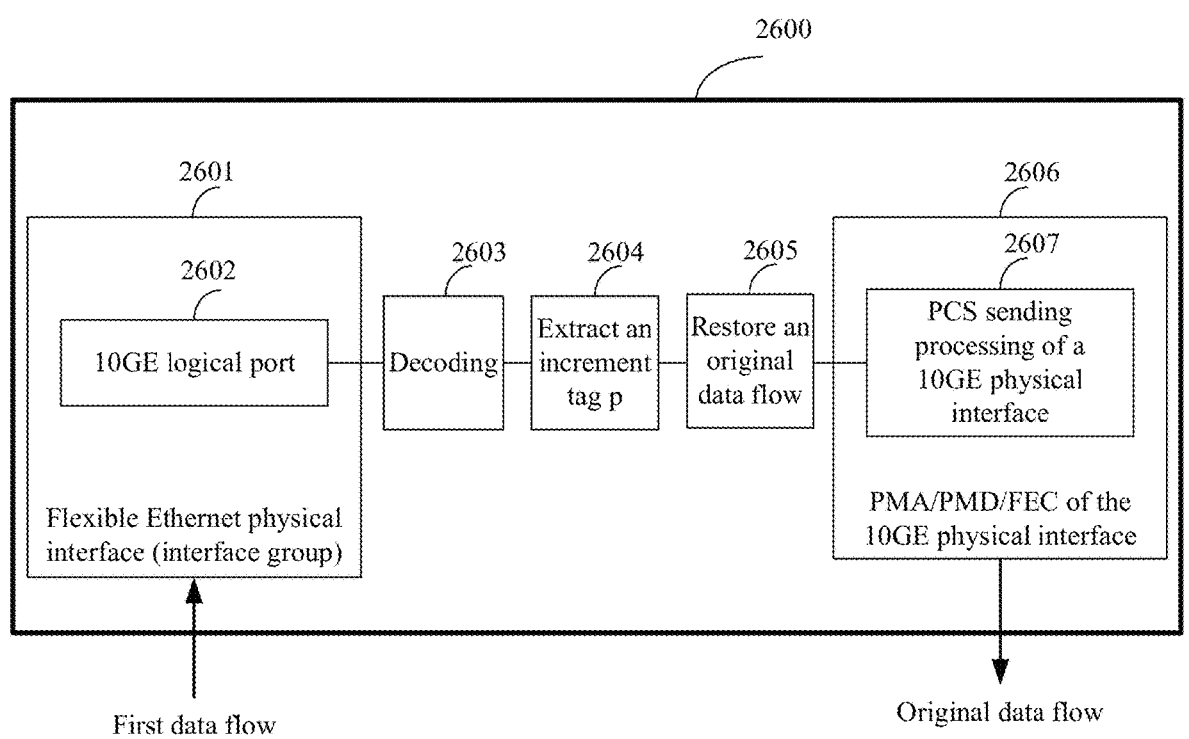
FIG. 26 is a schematic structural diagram of another receive-end device according to an embodiment of the present invention.

FIG. 26 is a schematic structural diagram of another receive-end device 2600 according to an embodiment of the present invention. As shown in FIG. 26, the receive-end device 2600 receives a first data flow by using a 10 GE logical port 2602 formed by a flexible Ethernet physical interface (or interface group) 2601; and after restoring the first data flow to an original data flow, may send, to a customer device by using PMA/PMD/FEC 2606 of a 10 GE physical interface, the restored original data flow. For PCS sending processing 2607 of the 10 GE physical interface, refer to the processing steps in the sending direction shown in FIG. 18. Increment tag p extraction 2604 and original data restoration 2605 may be implemented in a process of the PCS sending processing 2607, may be implemented in the 10 GE logical port 2602, or may be implemented independently. Optionally, the increment tag p extraction 2604 and the original data restoration 2605 may be performed after or before decoding 2603.

Figure 27:
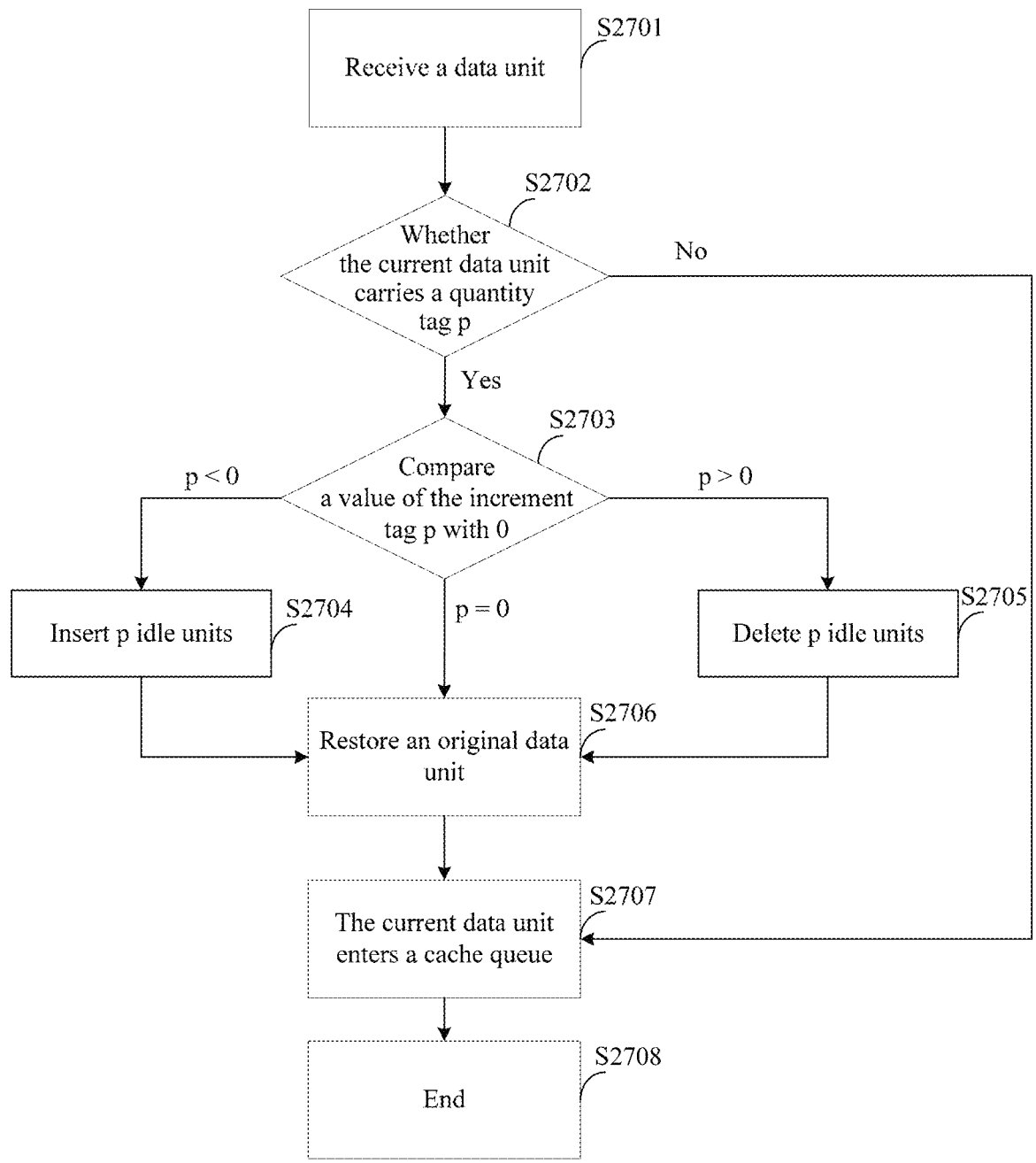
FIG. 27 is a flowchart of an increment tag extraction method according to an embodiment of the present invention.

FIG. 27 is a flowchart of an increment tag extraction method according to an embodiment of the present invention. As shown in FIG. 27, in S2701, a data unit is received from a first data flow. A data format of the data unit may include a block, a byte, or the like. For example, the data format of the data unit is a block, and data units of the first data flow may include a start block S, an end block T, a block D, an idle block, and the like. In S2702, if the current data unit carries an increment tag p, S2703 is performed, to compare a value of the increment tag p with "0". In S2704, if p<0, p idle units are inserted before the current data unit. In S2705, if p>0, p idle units are deleted before the current data unit. After S2704 or S2705 is performed, S2706 is performed. If p=0, S2706 is directly performed, to restore the current data unit to an original data unit. If the current data unit is an idle unit before the increment tag is inserted, the current data unit is restored to the idle unit. If the current data unit is a start unit before the increment tag is inserted, the current data unit is restored to the start unit. In S2707, the current data unit that is restored to the original data unit is sent to a cache queue. In S2708, a process ends, and a next data unit of the first data flow continues to be received. In S2702, if the current data unit carries no increment tag p, the current data unit is sent to a cache queue. In S2708, a process ends, and a next data unit of the first data flow continues to be received. By using the foregoing method process, a quantity of idle units in the restored data flow is the same as that in an original data flow obtained by a transmit-end device.

Figure 28:
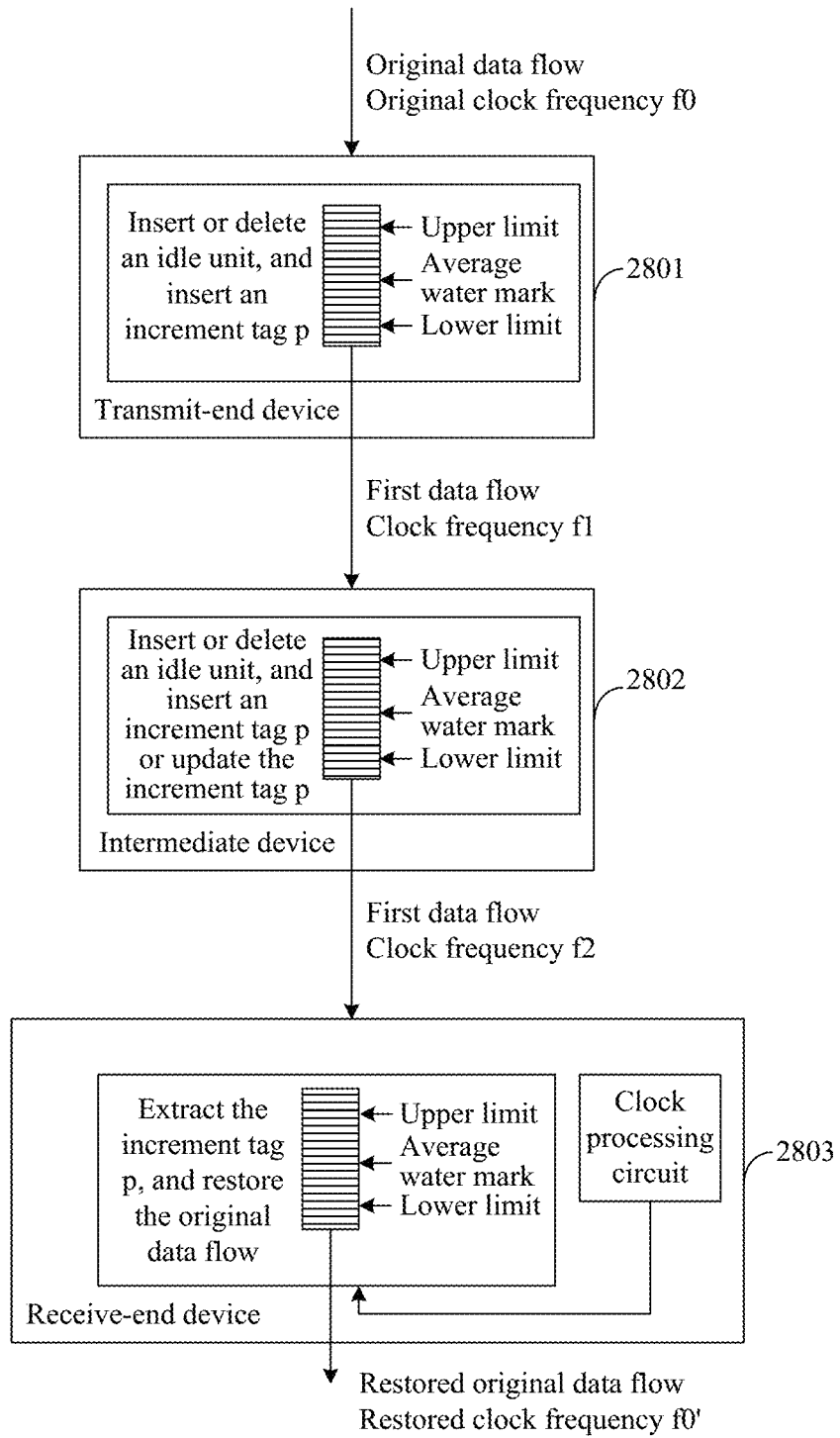
FIG. 28 is a schematic structural diagram of a clock frequency restoration system according to an embodiment of the present invention.

FIG. 28 is a schematic structural diagram of a clock frequency restoration system according to an embodiment of the present invention. As shown in FIG. 28, a transmit-end device 2801 and an intermediate device 2802 may insert or delete an idle unit, to implement rate adaptation. Therefore, a clock frequency changes in a transmission process. The transmit-end device 2801 receives an original data flow with a clock frequency of $f_0$, and sends a first data flow with a clock frequency of $f_1$. The first data flow may pass at least one intermediate device. The intermediate device 2802 may change the clock frequency of the first data flow, for example, from $f_1$ to $f_2$. A receive-end device 2803 restores the clock frequency $f_2$ of the first data flow to a clock frequency $f_0'$ of the original data flow. The restored clock frequency $f_0'$ may be slightly different from the original clock frequency $f_0$. However, when a difference between the two clock frequencies is in an allowable range, it may be considered that the original clock frequency is restored.

This embodiment of the present invention mainly describes how the receive-end device 2803 restores the original clock frequency. After inserting or deleting an idle unit, the transmit-end device 2801 inserts an increment tag p. After inserting or deleting an idle unit, the intermediate device 2802 inserts an increment tag p or updates the increment tag p. The receive-end device 2803 extracts the increment tag p. In a process of receiving or sending data, specific cache space needs to be set for the transmit-end device 2801, the intermediate device 2802, and the receive-end device 2803. An average water mark, an upper water mark limit, and a lower water mark limit may be set for a cache queue, so that the cache queue can support a water mark change. In the receive-end device 2803, a depth of a cache queue may be adjusted according to a size of the increment tag p in real time. For example, when an absolute value of p is relatively large, a depth of the queue is relatively large. Referring to the method process in FIG. 27, a data unit of the first data flow is sent into the cache queue, and the original data flow is restored. The receive-end device 2803 may monitor an average water mark change of the queue in real time; and when the average water mark gradually increases, gradually increases a clock frequency that is of the original data flow and that is output by the queue; or when the average water mark gradually decreases, gradually reduces a clock frequency that is of the original data flow and that is output by the queue. The clock frequency that is of the original data flow and that is output by the queue may be smoothly filtered by using a clock processing circuit, to keep a stable and unchanged average water mark of the queue, and implement stable generation of the original clock frequency $f_0'$.

In this embodiment of the present invention, the receive-end device extracts the increment tag p from the first data flow, to identify the quantity of changed idle units of the first data flow, obtained after an idle unit is inserted or deleted, relative to the original data flow; and can restore the original data flow according to the increment tag p, so as to obtain clock frequency and time phase information of the original data flow. This implements transparent transport of clock frequency and time phase information of a service.

Figure 29:
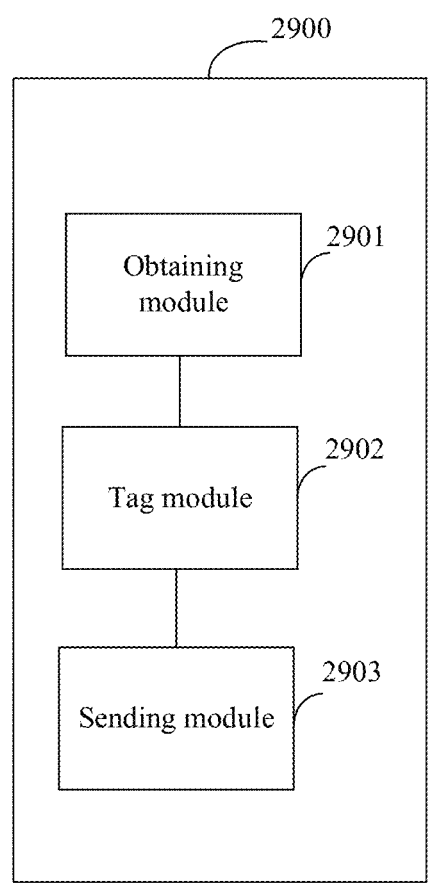
FIG. 29 is a schematic structural diagram of a service sending apparatus according to an embodiment of the present invention.

FIG. 29 is a schematic structural diagram of a service sending apparatus 2900 according to an embodiment of the present invention. The apparatus 2900 may be a flexible Ethernet device, an Ethernet device, an OTN device, an SDH device, or the like. As shown in FIG. 29, the apparatus 2900 may include an obtaining module 2901, a tag module 2902, and a sending module 2903. In this embodiment of the present invention, functional modules are logically divided, and there is more than one division manner. For example, the modules may be independent circuit modules, or may be integrated in one circuit module. The modules may be implemented in a form of an integrated circuit such as a chip. The service sending apparatus in this embodiment of the present invention may perform the method steps in the embodiment shown in FIG. 13.

The obtaining module 2901 is configured to obtain an original data flow. The tag module 2902 is configured to insert an increment tag p in the original data flow, to generate a first data flow, where the increment tag p is used to identify a quantity of changed idle units of the first data flow relative to the original data flow. The sending module 2903 is configured to send the first data flow.

Optionally, the tag module 2902 is configured to: obtain a first segment data flow from the original data flow, and determine a quantity of changed idle units of the first segment data flow relative to the original data flow; and insert an increment tag p at a first location in the first segment data flow, where the first location is a location of a data unit that can be used to carry the increment tag p, and the increment tag p is used to identify the quantity of changed idle units of the first segment data flow relative to the original data flow. Optionally, after the first segment data flow is obtained, an idle unit may be inserted in or deleted from the first segment data flow, and an increment tag p is used to identify a quantity of inserted or deleted idle units.

Optionally, the tag module 2902 is configured to: identify a start unit of the original data flow, and determine a location of the start unit as the first location.

Optionally, the tag module 2902 is configured to: set a threshold of the increment tag p; identify a first idle unit of the original data flow when the quantity of changed idle units of the first segment data flow relative to the original data flow is greater than or equal to the threshold; and determine a location of the first idle unit as the first location.

The apparatus 2900 further includes an insertion/deletion module. The insertion/deletion module is configured to: insert and/or delete n idle units in the original data flow, and determine the increment tag p according to the n idle units, where p is equal to n when the n idle units are inserted; or p is equal to −n when the n idle units are deleted.

In this embodiment of the present invention, the service sending apparatus inserts the increment tag p in the original data flow, to identify the quantity of changed idle units of the first data flow, obtained after an idle unit is inserted or deleted, relative to the original data flow. Therefore, a service receiving apparatus can restore the original data flow according to the increment tag p, so as to obtain clock frequency and time phase information of the original data flow. This implements transparent transport of clock frequency and time phase information of a service.

Figure 30:
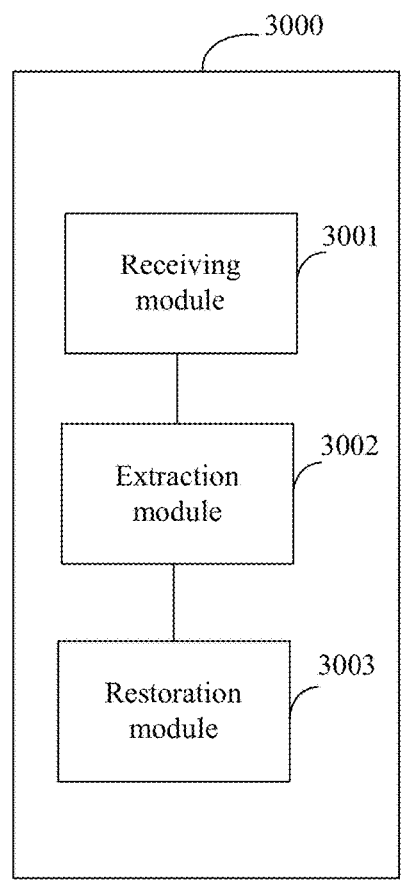
FIG. 30 is a schematic structural diagram of a service receiving apparatus according to an embodiment of the present invention.

FIG. 30 is a schematic structural diagram of a service receiving apparatus 3000 according to an embodiment of the present invention. The apparatus 3000 may be a flexible Ethernet device, an Ethernet device, an OTN device, an SDH device, or the like. As shown in FIG. 30, the apparatus 3000 may include a receiving module 3001, an extraction module 3002, and a restoration module 3003. In this embodiment of the present invention, functional modules are logically divided, and there is more than one division manner. For example, the modules may be independent circuit modules, or may be integrated in one circuit module. The modules may be implemented in a form of an integrated circuit such as a chip. The service receiving apparatus in this embodiment of the present invention may perform the method steps in the embodiment shown in FIG. 24.

The receiving module 3001 is configured to receive a first data flow. The extraction module 3002 is configured to extract an increment tag p from the first data flow, where the increment tag p is used to identify a quantity of changed idle units of the first data flow relative to an original data flow. The restoration module 3003 is configured to restore the first data flow to the original data flow according to the increment tag p.

Optionally, the extraction module 3002 is configured to: obtain a first segment data flow from the first data flow, and determine a first location in the first segment data flow; and extract an increment tag p from the first location, where the first location is a location of a data unit that can be used to carry the increment tag p, and the increment tag p is used to identify a quantity of changed idle units of the first segment data flow relative to the original data flow. Optionally, the first location is a location of a start unit or a location of a first idle unit.

The restoration module 3003 is configured to: insert p idle units in the first data flow when the increment tag p is greater than 0; or delete idle units, whose quantity is an absolute value of p, from the first data flow when the increment tag p is less than 0.

The apparatus 3000 further includes a clock module, configured to obtain a clock frequency of the original data flow.

In this embodiment of the present invention, the service receiving apparatus extracts the increment tag p from the first data flow, to identify the quantity of changed idle units of the first data flow, obtained after an idle unit is inserted or deleted, relative to the original data flow; and can restore the original data flow according to the increment tag p, so as to obtain clock frequency and time phase information of the original data flow. This implements transparent transport of clock frequency and time phase information of a service.

Figure 31:
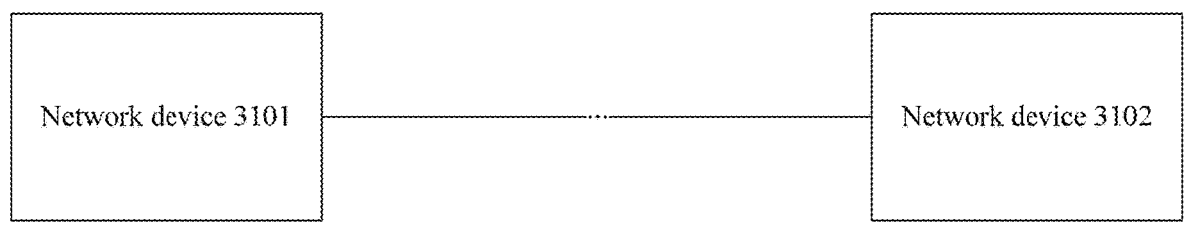
FIG. 31 is a schematic structural diagram of a network system according to an embodiment of the present invention.

FIG. 31 is a schematic structural diagram of a network system according to an embodiment of the present invention. The network system may be flexible Ethernet, the Ethernet, an OTN, an SDH network, or the like. As shown in FIG. 31, the network system may include at least two network devices, such as a network device 3101 and a network device 3102. Each network device may be a sending network device or a receiving network device, and may be in the structure shown in FIG. 29 and/or FIG. 30.

Figure 32:
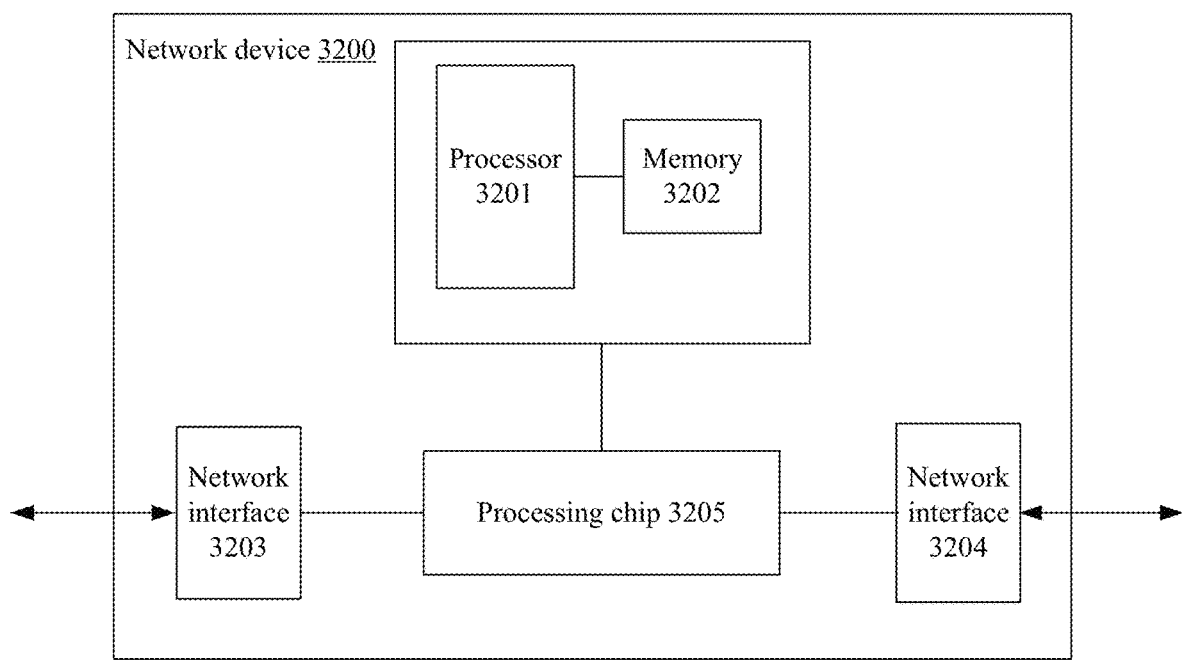
FIG. 32 is a schematic structural diagram of a network device according to an embodiment of the present invention.

FIG. 32 is a schematic structural diagram of a network device according to an embodiment of the present invention. The network device may be a flexible Ethernet device, an Ethernet device, an OTN device, an SDH device, or the like. As shown in FIG. 32, the network device 3200 may include a processor 3201, a memory 3202, at least one network interface (such as a network interface 3203 and a network interface 3204), and a processing chip 3205.

The processor 3201 may be a general-purpose central processing unit (Central Processing Unit, CPU), a microprocessor, a network processing unit (Network Processing Unit, NPU), an application-specific integrated circuit (Application-Specific Integrated Circuit, ASIC), or at least one integrated circuit, and is configured to execute a related program, so as to implement the technical solution provided in this embodiment of the present invention.

The memory 3202 may be a read-only memory (Read-Only Memory, ROM), a static storage device, a dynamic storage device, or a random access memory (Random Access Memory, RAM). The memory 3202 may store an operating system and another application program. When the technical solution provided in this embodiment of the present invention is implemented by using software or firmware, program code used to implement the technical solution provided in this embodiment of the present invention is stored in the memory 3202 and is executed by the processor 3201.

A transceiver apparatus such as, but not limited to, a transceiver is used at the network interfaces 3203 and 3204, to implement communication between the network device 3200 and another device or a communications network. For example, the network interfaces 3203 and 3204 may have a sending function or a receiving function, or may have both a sending function and a receiving function. Herein, the network interfaces 3203 and 3204 may be logical ports (such as logical ports formed by several timeslots), or may be physical interfaces (such as 100 G flexible Ethernet physical interfaces).

The processing chip 3205 may be implemented by an ASIC, a field-programmable gate array (Field-Programmable Gate Array, FPGA), or the like. The processing chip 3205 may be a dedicated chip for implementing the technical solutions of the present invention, or may be a general-purpose chip including a function of implementing the technical solutions of the present invention.

In an example, the network device 3200 obtains an original data flow by using the network interface 3203 or 3204. The network device 3200 executes, by using the processor 3201, code stored in the memory 3202, or executes, by using the processing chip 3205, code stored in the processing chip 3205, to implement: inserting an increment tag p in the original data flow, to generate a first data flow, where the increment tag p is used to identify a quantity of changed idle units of the first data flow relative to the original data flow; and sending the first data flow by using the network interface 3203 or 3204.

In another example, the network device 3200 receives a first data flow by using the network interface 3203 or 3204. The network device 3200 executes, by using the processor 3201, code stored in the memory 3202, or executes, by using the processing chip 3205, code stored in the processing chip 3205, to implement: extracting an increment tag p from the first data flow, where the increment tag p is used to identify a quantity of changed idle units of the first data flow relative to an original data flow; and restoring the first data flow to the original data flow according to the increment tag p.

Specifically, the network device 3200 shown in FIG. 32 may implement a technical solution in any embodiment of the present invention. For example, the apparatus 2900 in FIG. 29 and the apparatus 3000 in FIG. 30 may be implemented by using the structure and the solution of the network device 3200. It should be noted that the network device 3200 shown in FIG. 32 shows only the processor 3201, the memory 3202, the network interfaces 3203 and 3204, and the processing chip 3205. However, in a specific implementation process, a person skilled in the art should understand that the network device 3200 further includes another device mandatory for implementing normal operating. In addition, according to a specific requirement, a person skilled in the art should understand that the network device 3200 may further include a hardware device for implementing another additional function. For example, the network device 3200 further includes a power supply, a fan, a clock unit, and a main control unit. In addition, a person skilled in the art should understand that the network device 3200 may include only a device mandatory for implementing the embodiments of the present invention, and does not need to include all the devices shown in FIG. 32.

In this embodiment of the present invention, a transmit-end network device inserts an increment tag p in an original data flow, to identify a quantity of changed idle units of a first data flow, obtained after an idle unit is inserted or deleted, relative to the original data flow. Therefore, a receive-end network device can restore the original data flow according to the increment tag p, so as to obtain clock frequency and time phase information of the original data flow. This implements transparent transport of clock frequency and time phase information of a service.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A service sending method, wherein the method comprises:
   obtaining, by a transmit-end device, an original data flow;
   inserting an increment tag p in the original data flow, to generate a first data flow, wherein the increment tag p identifies a quantity of changed idle units of the first data flow relative to the original data flow, and wherein the inserting the increment tag p in the original data flow comprises:
      obtaining a first segment data flow from the original data flow;
      determining a quantity of changed idle units of the first segment data flow relative to the original data flow; and
      inserting the increment tag p at a first location in the first segment data flow, wherein the first location is a location of a data unit that carries the increment tag p, and the increment tag p identifies the quantity of changed idle units of the first segment data flow relative to the original data flow; and
   sending the first data flow.

2. The method according to claim 1, wherein the obtaining the first segment data flow from the original data flow comprises:
   identifying a start unit of the original data flow; and
   determining a location of the start unit as the first location.

3. The method according to claim 1, wherein the obtaining the first segment data flow from the original data flow comprises:
   setting a threshold of the increment tag p;
   identifying a first idle unit of the original data flow when the quantity of changed idle units of the first segment data flow relative to the original data flow is greater than or equal to the threshold; and
   determining a location of the first idle unit as the first location.

4. The method according to claim 1, wherein before the inserting the increment tag p in the original data flow, the method further comprises:
   inserting or deleting n idle units in the original data flow; and
   determining the increment tag p according to the n idle units, wherein
   p is equal to n when the n idle units are inserted; or
   p is equal to −n when the n idle units are deleted.

5. A service receiving method, wherein the method comprises:
   receiving, by a receive-end device, a first data flow;
   extracting an increment tag p from the first data flow, wherein the increment tag p identifies a quantity of changed idle units of the first data flow relative to an original data flow, wherein the extracting the increment tag p from the first data flow comprises:
      obtaining a first segment data flow from the first data flow;
      determining a first location in the first segment data flow; and
      extracting the increment tag p from the first location, wherein the first location is a location of a data unit that carries the increment tag p, and the increment tag p identifies a quantity of changed idle units of the first segment data flow relative to the original data flow; and
   restoring the first data flow to the original data flow according to the increment tag p.

6. The method according to claim 5, wherein the restoring the first data flow to the original data flow comprises:
   inserting p idle units in the first data flow when the increment tag p is greater than 0; or
   reducing idle units, whose quantity is an absolute value of p, from the first data flow when the increment tag p is less than 0.

7. The method according to claim 5, wherein the first location is a location of a start unit or a location of a first idle unit.

8. The method according to claim 5, wherein the method further comprises:
obtaining a clock frequency of the original data flow.

9. A service sending apparatus, wherein the apparatus comprises:
a non-transitory memory storage comprising instructions; and
one or more hardware processors in communication with the non-transitory memory storage, wherein the one or more hardware processors execute the instructions to:
obtain an original data flow;
insert an increment tag p in the original data flow, to generate a first data flow, wherein the increment tag p identifies a quantity of changed idle units of the first data flow relative to the original data flow, wherein the one or more hardware processors execute the instructions to:
obtain a first segment data flow from the original data flow;
determine a quantity of changed idle units of the first segment data flow relative to the original data flow; and
insert the increment tag p at a first location in the first segment data flow, wherein the first location is a location of a data unit that carries the increment tag p, and the increment tag p identifies the quantity of changed idle units of the first segment data flow relative to the original data flow; and
send the first data flow.

10. The apparatus according to claim 9, wherein the one or more hardware processors execute the instructions to:
identify a start unit of the original data flow; and
determine a location of the start unit as the first location.

11. The apparatus according to claim 9, wherein the one or more hardware processors execute the instructions to:
set a threshold of the increment tag p;
identify a first idle unit of the original data flow when the quantity of changed idle units of the first segment data flow relative to the original data flow is greater than or equal to the threshold; and
determine a location of the first idle unit as the first location.

12. The apparatus according to claim 9, wherein the one or more hardware processors execute the instructions to:
insert or delete n idle units in the original data flow; and
determine the increment tag p according to the n idle units, wherein
p is equal to n when the n idle units are inserted; or
p is equal to −n when the n idle units are deleted.

\* \* \* \* \*